(12) United States Patent
Inoue et al.

(10) Patent No.: US 8,566,554 B2
(45) Date of Patent: Oct. 22, 2013

(54) STORAGE APPARATUS TO WHICH THIN PROVISIONING IS APPLIED AND INCLUDING LOGICAL VOLUMES DIVIDED INTO REAL OR VIRTUAL AREAS

(75) Inventors: Shiori Inoue, Kawasaki (JP); Kenichi Miki, Yokohama (JP); Masaharu Murakami, Odawara (JP); Takeshi Horiuchi, Yokohama (JP); Takashi Watanabe, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 358 days.

(21) Appl. No.: 13/023,250

(22) Filed: Feb. 8, 2011

(65) Prior Publication Data
US 2012/0144147 A1 Jun. 7, 2012

(30) Foreign Application Priority Data
Dec. 3, 2010 (JP) ................. 2010-270803

(51) Int. Cl.
*G06F 12/02* (2006.01)
(52) U.S. Cl.
USPC ........... 711/170; 711/100; 711/114; 711/154; 711/165; 711/E12.001; 711/E12.002
(58) Field of Classification Search
USPC ................. 711/100, 114, 154, 165, 170–171, 711/E12.001, E12.002
See application file for complete search history.

(56) References Cited

U.S. PATENT DOCUMENTS

| 2005/0228802 | A1 | 10/2005 | Kezuka et al. |
| 2009/0228653 | A1 | 9/2009 | Yamagami |
| 2010/0070731 | A1* | 3/2010 | Mizuno et al. ................. 711/170 |

FOREIGN PATENT DOCUMENTS

| JP | 2005-234820 | 9/2005 |
| JP | 2005-301627 | 10/2005 |

* cited by examiner

*Primary Examiner* — Jasmine Song
(74) *Attorney, Agent, or Firm* — Foley & Lardner LLP

(57) ABSTRACT

A storage control apparatus includes a first logical volume in which data has been stored in a pool that includes at least one of one or a plurality of logical volumes based on a plurality of physical storage devices as a pool volume, and divides the first logical volume into at least two real areas. The storage control apparatus allocates the first logical volume to a second logical volume that is a virtual logical volume that has been divided into at least two virtual areas. The storage control apparatus executes a first data movement processing for moving all data of the first logical volume to at least one pool volume other than the first logical volume, and allocates a real area of a movement destination of the data to a virtual area of an allocated destination of a real area of a movement source of the data as substitute for the real area in the first data movement processing.

13 Claims, 27 Drawing Sheets

| VOL ID | VOL type | RAID group ID | Pool ID | Drive type | Number of rotations | Hierarchy rank order | External VOL flag | Storage ID |
|---|---|---|---|---|---|---|---|---|
| 0A00 | 3 | - | 1 | SAS | 15kprm | 2 | On | 11111 |
| 0001 | 3 | 2-3 | 1 | SATA | 10kprm | 4 | Off | 00001 |
| 0002 | 3 | 2-2 | 1 | SSD | - | 1 | Off | 00001 |
| 00003 | 1 | 1-2 | - | SAS | 15kprm | 2 | Off | 00001 |
| ... | ... | ... | ... | ... | ... | ... | ... | ... |
| 0010 | 1 | 1-5 | - | SAS | 15kprm | 2 | Off | 00001 |
| 0011 | 2 | - | 2 | SAS | 10kprm | 3 | - | 00001 |
| ... | ... | ... | ... | ... | ... | ... | ... | ... |

| External storage ID | External VOL ID | External storage group ID | VOL ID | Drive type | Number of rotations |
|---|---|---|---|---|---|
| 11111 | 0003 | E11-1 | 0080 | SAS | 15kprm |
| 11111 | 0001 | E11-1 | 0080 | SATA | 10kprm |
| 11111 | 0010 | E11-2 | 0A02 | SSD | 15kprm |
| 11111 | 0011 | E11-2 | 0A03 | SAS | 15kprm |
| ... | ... | ... | ... | ... | ... |
| 12345 | 0020 | E20-2 | 0A10 | SAS | 15kprm |
| 12345 | 0021 | E20-2 | 0A11 | SAS | 15kprm |
| ... | ... | ... | ... | ... | ... |

| Storage ID | Location | Data center | Model type | Manufacturer | Introduction date |
|---|---|---|---|---|---|
| ⓒ00001 | Tokyo | 1 | Model type A | H | 2010/1/1 |
| 11111 | Tokyo | 1 | Model type A | H | 2010/1/1 |
| 11112 | Tokyo | 1 | Model type A | H | 2010/1/1 |
| 11113 | Tokyo | 1 | Model type A | H | 2010/1/1 |
| 11114 | Tokyo | 2 | Model type A | H | 2010/1/1 |
| ... | ... | ... | ... | ... | ... |
| 12345 | Osaka | 3 | Model type B | H | 2009/7/1 |
| 12346 | Osaka | 3 | Model type B | H | 2009/7/1 |
| ... | ... | ... | ... | ... | ... |

700 Pool VOL ID: 0A03

| Real page ID (701) | Virtual page ID (702) |
|---|---|
| 0A03-01 | 1000-01 |
| 0A03-02 | 1001-A0 |
| 0A03-03 | 1003-03 |
| 0A03-04 | 1005-04 |
| ... | ... |
| 0A03-05 | 0B00-01 |
| 0A03-06 | 0BA0-10 |
| ... | ... |

FIG. 8

| Pool ID | Pool VOL ID | Format inhibition flag | Displacement flag | Monitoring flag |
|---|---|---|---|---|
| 1 | 0101 | Off | Off | On |
| 1 | 0102 | Off | Off | On |
| 1 | 0103 | Off | Off | On |
| 1 | 0100 | Off | Off | On |
| ... | ... | ... | ... | ... |
| 2 | 0A00 | On | On | On |
| 2 | 0A01 | On | On | On |
| ... | ... | ... | ... | ... |

900 Pool VOL ID: 0A03

| Real page ID | Date and time | Performance (IOPS) |
|---|---|---|
| 0A02-01 | 2010/9/1/00:00 | 10 |
| 0A02-02 | 2010/9/1/00:01 | 13 |
| 0A02-03 | 2010/9/1/00:02 | 03 |
| 0A02-04 | 2010/9/1/00:03 | 05 |
| ... | ... | ... |
| 0A02-05 | 2010/9/1/23:00 | 09 |
| 0A02-06 | 2010/9/1/23:01 | 02 |
| ... | ... | ... |

Pool VOL ID: 0A03

| Real page ID (1001) | Relocation destination real page ID (1002) | Displacement completion flag (1003) |
|---|---|---|
| 0A03-01 | 0C00-01 | Off |
| 0A03-02 | 0400-03 | Off |
| 0A03-03 | 0CA0-10 | Off |
| 0A03-04 | 0400-10 | Off |
| ... | ... | ... |
| 0A03-07 | 0500-30 | On |
| 0A03-08 | 0900-1f | On |
| ... | ... | ... |

FIG. 11

Pool ID: 4 — 1100

| Real page ID | Priority level 1102 |
|---|---|
| 0A03-01 | 1 |
| 0A03-02 | 5 |
| 0A03-03 | 2 |
| 0A03-04 | 3 |
| ... | ... |
| 0A03-07 | 6 |
| 0A03-08 | 4 |
| ... | ... |

1101

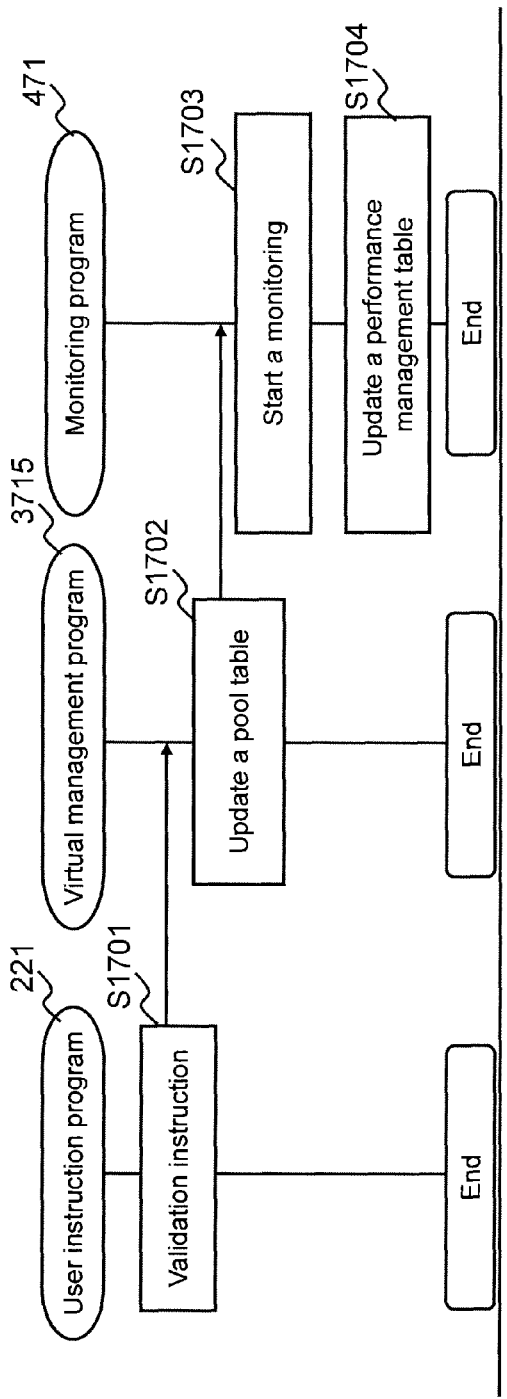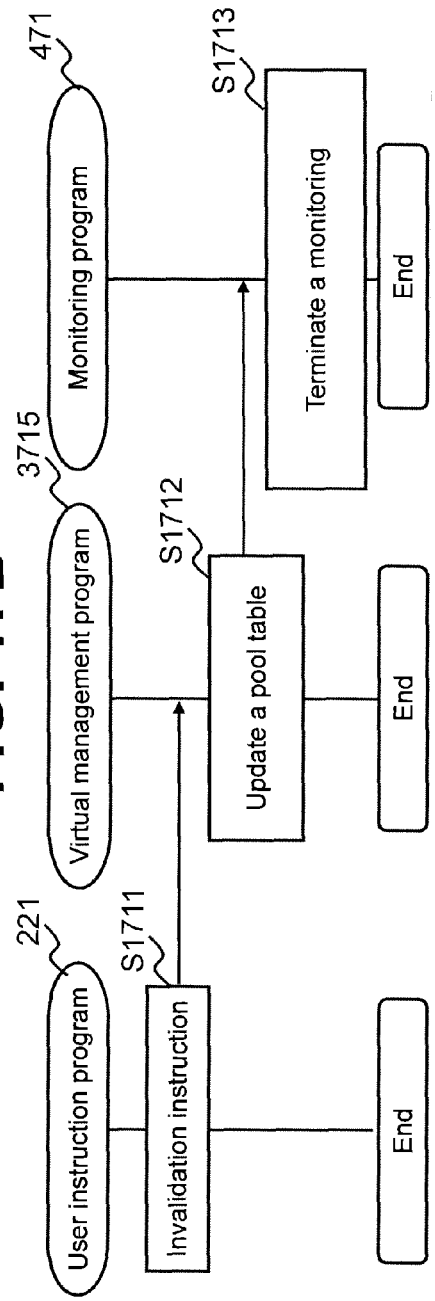

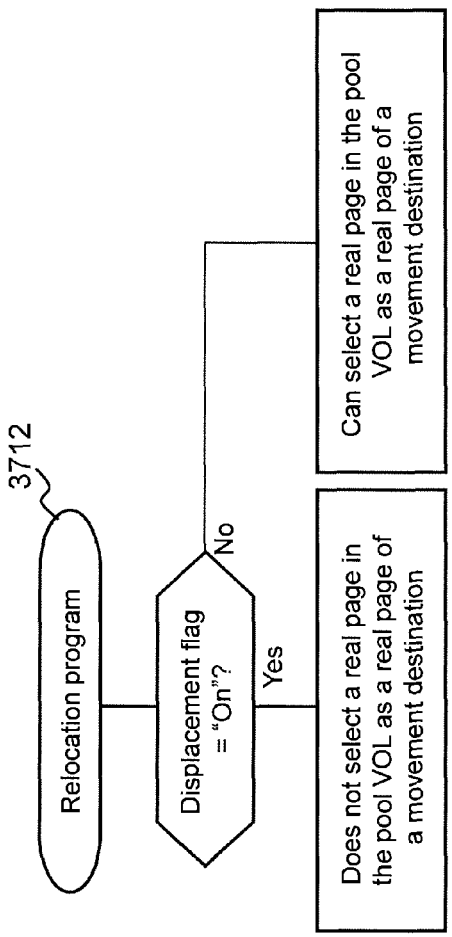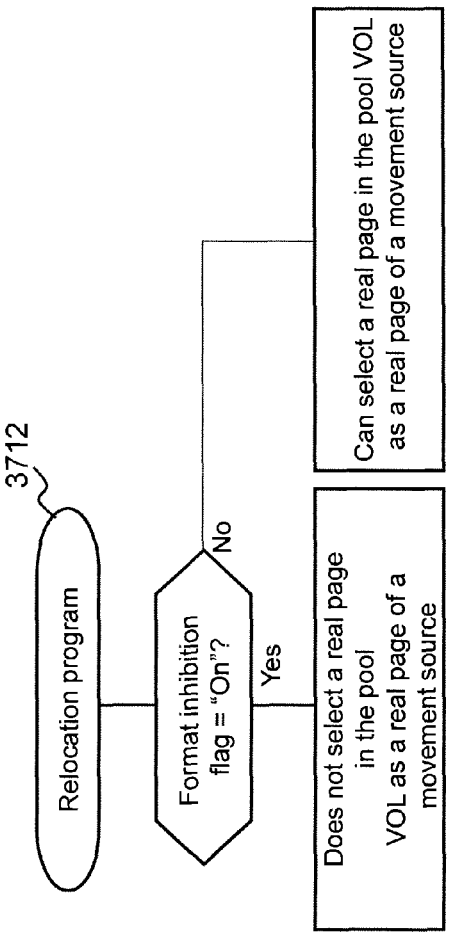

STORAGE APPARATUS TO WHICH THIN PROVISIONING IS APPLIED AND INCLUDING LOGICAL VOLUMES DIVIDED INTO REAL OR VIRTUAL AREAS

CROSS-REFERENCE TO PRIOR APPLICATION

This application relates to and claims the benefit of priority from Japanese Patent Application No. 2010-270803 filed on Dec. 3, 2010, the entire disclosure of which is incorporated herein by reference.

BACKGROUND

The present invention generally relates to a storage control apparatus to which Thin Provisioning is applied.

In the case in which a host computer recognizes a logical volume in a first storage apparatus and writes the data to the logical volume, a second storage apparatus is used as substitute for the first storage apparatus as a write destination of the data from the host computer. In this case, it is necessary that the data is moved from the first storage apparatus to the second storage apparatus.

The storage apparatus to which Thin Provisioning (also referred to as Dynamic Provisioning) is applied is publicly known (see Patent Literature 1). The storage apparatus of this type is provided with a virtual logical volume (hereafter referred to as a virtual VOL) that is configured by a plurality of virtual pages (virtual storage areas) and a pool that is configured by a plurality of pool VOLs in general. The pool VOL is a logical volume that is made to be a member of a pool and is configured by at least two real pages (substantive storage areas). In the case in which the storage apparatus writes data to a virtual page and a virtual page of a write destination is an unallocated virtual page, the storage apparatus allocates a real page to the virtual page from a pool and writes the data of a write target to the allocated real page. In the case in which the data is moved from the first storage apparatus to the second storage apparatus, it is thought that the data is moved from a logical volume in the first storage apparatus to a virtual VOL in the second storage apparatus for instance. Moreover, the technology for moving the data in a unit of a page to other storage medium is also disclosed (see Patent Literature 2).

Patent Literature 1: Japanese Patent Application Laid-Open Publication No. 2005-234820
Patent Literature 2: Japanese Patent Application Laid-Open Publication No. 2005-301627

SUMMARY

However, in the case in which the data is moved from a logical volume (hereafter referred to as an external VOL) in the first storage apparatus to a virtual VOL in the second storage apparatus, the following problem occurs in some cases.

In the case in which a storage capacity of an external VOL is large, it takes long time to move data from an external VOL to a virtual VOL.

The problem of this kind may occur not only in the case in which the data is moved from a logical volume that is disposed outside the second storage apparatus (an external VOL) to a virtual VOL in the second storage apparatus but also in the case in which the data is moved from a logical volume in the second storage apparatus to a virtual VOL in the second storage apparatus.

Consequently, an object of the present invention is to suppress a time that is taken for moving the data from a logical volume to a virtual volume that complies with Thin Provisioning.

Other objects of the present invention will be clarified by the explanation of the modes described later.

A storage control apparatus includes a first logical volume in which data has been stored in a pool that includes at least one of one or a plurality of logical volumes based on a plurality of physical storage devices as a pool volume, and divides the first logical volume into at least two real areas. The storage control apparatus allocates the first logical volume to a second logical volume that is a virtual logical volume that has been divided into at least two virtual areas. The storage control apparatus executes a first data movement processing for moving all data of the first logical volume to at least one pool volume other than the first logical volume, and allocates a real area of a movement destination of the data to a virtual area of an allocated destination of a real area of a movement source of the data as substitute for the real area in the first data movement processing.

At least one physical storage device can also be a storage apparatus that is disposed outside the storage control apparatus. Moreover, at least one physical storage device can also be a physical storage medium such as an HDD (Hard Disk Drive) and an SSD (Solid State Drive).

The storage control apparatus can also be a storage apparatus that is provided with at least two physical storage media, a controller part that is mounted in the storage apparatus, or an intelligent switch device that is disposed between the storage apparatus and a host.

BRIEF DESCRIPTION OF THE DRAWINGS

FIG. 4 is a view showing a configuration example of an internal VOL table 400.

FIG. 5 is a view showing a configuration example of an external VOL table 500.

FIG. 6 is a view showing a configuration example of a storage apparatus management table 600.

FIG. 7 is a view showing a configuration example of a virtual mapping table 700.

FIG. 8 is a view showing a configuration example of a pool table 800.

FIG. 9 is a view showing a configuration example of a performance management table 900.

FIG. 10 is a view showing a configuration example of a displacement progress table 1000.

FIG. 11 is a view showing a configuration example of a relocation target table 1100.

FIG. 17A is a flowchart showing a flow of a monitoring validation processing.

FIG. 17B is a flowchart showing a flow of a monitoring invalidation processing.

FIG. 27A is a view showing an example of a function of a displacement flag 804.

FIG. 27B is a view showing an example of a function of a format inhibition flag 803.

DETAILED DESCRIPTION OF THE EMBODIMENT

An embodiment (example) of the present invention will be described below in detail with reference to the drawings.

In the following descriptions, a wide variety of information is described by using an expression of "xxx table" in some cases. However, a wide variety of information can also be described by using a data structure other than a table. In order to indicate that a wide variety of information does not depend on a data structure, "xxx table" can also be referred to as "xxx information". In the following descriptions moreover, a storage apparatus will be described as an example of a storage control apparatus.

In the following descriptions moreover, an ID (an identifier) or a number is used to specify an element. However, the information of the other kinds (such as a name) can also be used as the identification information.

In the following descriptions moreover, although a processing will be described using a "program" as a subject in some cases, a program is executed by a processor (for instance, a CPU (Central Processing Unit)) and a defined processing is executed by using a storage resource (for instance, a memory) and/or a communication interface device (for instance, a communication port) as needed, whereby a subject of a processing can also be a processor. A processing that is described using a program as a subject can also be a processing that is executed by a storage apparatus, a controller that is included in the storage apparatus, or a management computer. Moreover, a processor can also include a hardware circuit that executes a part or a whole of processes that are executed by the processor. A computer program can also be installed to each of the computers from a program source. A program source can also be a program distribution server or a storage medium for instance.

In the following descriptions moreover, the term of "date and time" will be used. However, "date and time" can also indicate the information of date and time, and can also indicate an hour, a minute, and a second (a second after the decimal point can also be included) as a matter of course.

Figure 1:
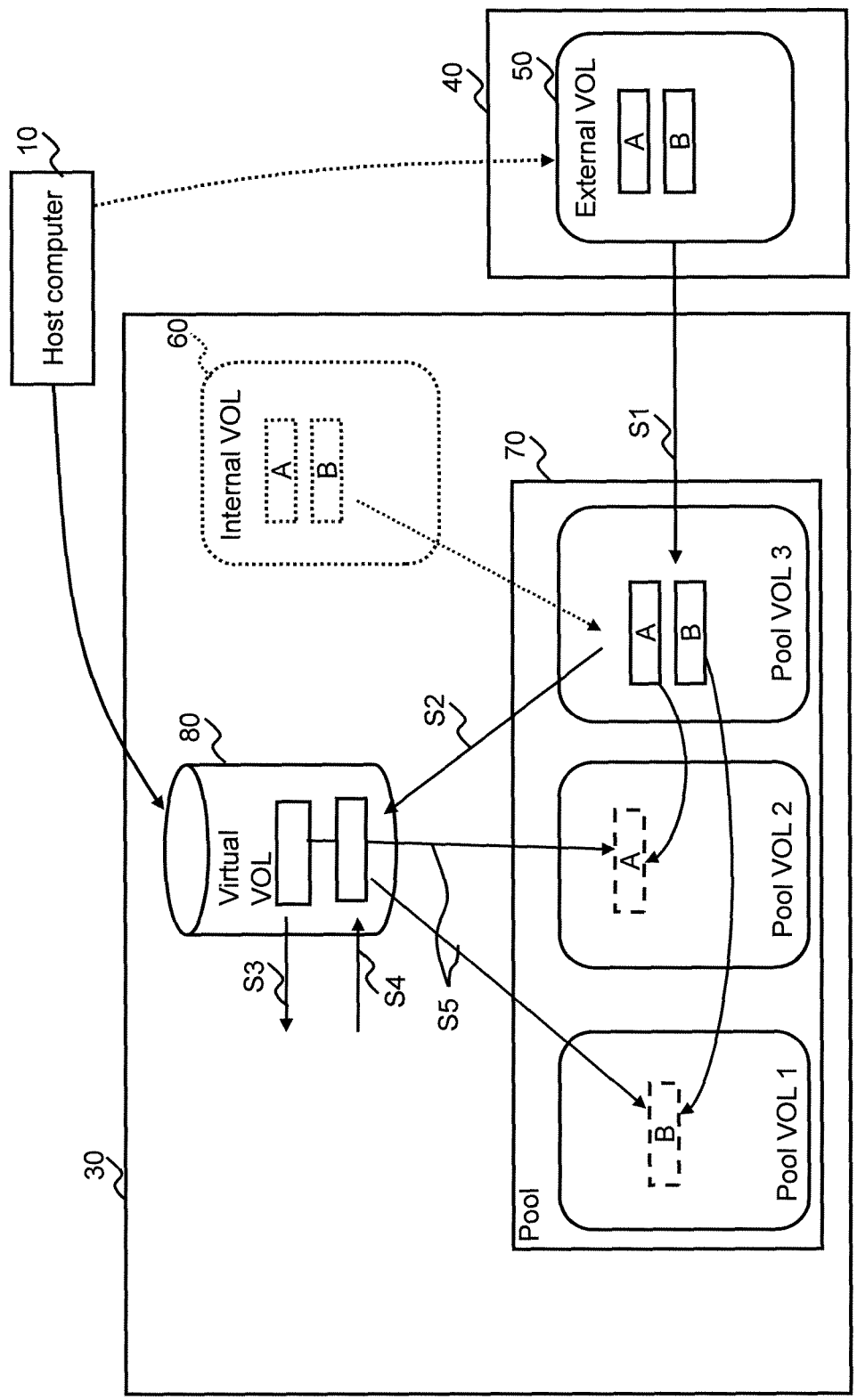
FIG. 1 is a view showing an outline in accordance with an embodiment of the present invention.

FIG. 1 is a view showing an outline in accordance with an embodiment of the present invention. In the following descriptions, a volume is abbreviated to a "VOL" in some cases.

A storage apparatus 30 that complies with Thin Provisioning is disposed. The storage apparatus 30 is provided with a pool 70. The pool 70 is configured by at least one pool VOL. The pool VOL is a logical volume that is included in the pool 70 among at least one logical volume (hereafter referred to as an internal VOL) that is included in the storage apparatus 30. The pool VOL can be a normal VOL, or can be a mapped VOL. The normal VOL is a logical volume that is based on at least one physical storage medium (for instance, a RAID (Redundant Array of Independent (or Inexpensive) Disks) group) that is included in the storage apparatus 30. The mapped VOL is a virtual logical volume in which a logical volume 50 (hereafter referred to as an external VOL) that is included in another storage apparatus 40 (hereafter referred to as an external storage apparatus) that is disposed outside the storage apparatus 30 is mapped.

The pool VOL is configured by at least two real pages (physical areas that are physical storage areas). In the case in which the storage apparatus 40 receives a write command that specifies an address that belongs to an unallocated virtual page of at least two virtual pages that configure a virtual VOL (a virtual logical volume that complies with Thin Provisioning), the storage apparatus 40 allocates any one of the unallocated real pages in the pool 70 to the virtual page and writes the data that accompanies the write command to the real page.

A plurality of external storage apparatuses can be disposed, and similarly a plurality of external VOLs can be disposed. The plurality of external VOLs can be included in one external storage apparatus, or can be included in a plurality of external storage apparatuses. The pool 70 can include a plurality of mapped VOLs. To make the descriptions be understood more easily, one external storage apparatus is disposed and data in one external VOL is moved as an example.

A host computer 10 recognizes an external VOL 50, and transmits an I/O (Input/Output) command that specifies the external VOL 50 to an external storage apparatus 40. In this case, the data that is used by the host computer 10 has been stored into the external VOL 50. The data that has been stored into the external VOL 50 is data A and data B as shown in FIG. 1 for instance. The data A and data B is provided with a capacity equal to or less than that of a real page respectively.

Due to some reason, the external storage apparatus 40 is removed. The "some reason" is that a specified period of time has elapsed from a day when the external storage apparatus 40 is operated at first (hereafter referred to as an introduction date) or that a frequency of an occurrence of an error in the external storage apparatus 40 becomes higher than a predetermined value for instance. In this case, it is necessary that data in the external VOL 50 is moved to the storage apparatus 30.

In the case in which data is moved from the external VOL 50 to the virtual VOL however, it takes a long period of time to move data when a capacity of the external VOL 50 is large.

In the present embodiment, a data movement from the external VOL 50 to the storage apparatus 30 is completed in the following procedures. "S" in the figure is an abbreviation of a step.

(S1) The storage apparatus 40 maps the external VOL 50 to an internal VOL, includes the mapped VOL in which the external VOL 50 is mapped in the pool 70, and divides the mapped VOL (a pool VOL 3) into at least two real pages. In the present embodiment, the data A is included in a first real page and the data B is included in a second real page.

(S2) The storage apparatus 40 allocates the pool VOL 3 to a virtual VOL 80. More specifically, a virtual VOL 80 that is provided with a storage capacity that is equivalent to that of the pool VOL 3 is prepared, and the storage apparatus 40 allocates all real pages that configure the pool VOL 3 to all virtual pages that configure the virtual VOL 80 respectively.

The storage apparatus 40 provides the virtual VOL 80 to the host computer 10. The host computer 10 recognizes the virtual VOL 80 as substitute for the external VOL 50. That is, the host computer 10 recognizes an image that is equivalent to that of the external VOL 50. More specifically, the host computer 10 recognizes that the data A and the data B exist in the virtual VOL 80. This is because the virtual VOL 80 is corresponded to the external VOL 50 through the pool VOL 3. However, the data A and the data B do not exist in the storage apparatus 30 in a practical sense, and the data A and the data B exist in the external VOL 50. In the processing that is described in this paragraph, the storage apparatus 30 takes over the identification information (such as a LUN (Logical Unit Number)) of the external VOL 50, and can allocate the identification information to the virtual VOL 80. In this case, the host computer 10 can transmit an I/O command that specifies the I/O destination information that is equivalent to the I/O destination information that has been specified by the I/O command for an I/O to the external VOL 50 and therefore can execute an I/O to the virtual VOL 80. The I/O destination information includes the identification information (such as a LUN) of the virtual VOL 80 and an address of the virtual VOL 80 (such as an LBA (Logical Block Address)). In the (S2), only a real page in which the valid data (the data that is used by the host computer 10) has been stored among the pool VOL 3 can also be allocated to a virtual page (a virtual page of the virtual VOL 80) that belongs to an address that is corresponded to address of the real page.

The host computer 10 transmits an I/O command that specifies the I/O destination information that includes arbitrary address of the virtual VOL 80 in an appropriate manner. The storage apparatus 30 receives the I/O command. The storage apparatus 30 executes an I/O to the virtual VOL 80 in accordance with the I/O command. More specifically, the storage apparatus 30 executes the following processing for instance:
- specifies a virtual page (a virtual page of the virtual VOL 80) that belongs to an address that is included in the I/O destination information that is specified by the I/O command;
- judges whether or not the specified virtual page is an unallocated virtual page;
- in the case in which the result of the judgment is positive, executes an I/O to a real page that has been allocated to the specified virtual page (in the case in which a real page has been allocated to the all virtual pages, the result of the above judgment is positive on a constant basis in the (s2));
- in the case in which the result of the judgment is negative and the I/O command is a write command, allocates an unallocated real page to the specified virtual page and writes data to the allocated real page; and
- in the case in which the result of the judgment is negative and the I/O command is a read command, transmits the predetermined data (for instance, zero data that is data that is configured by bits of which a value is zero) to the host computer 10.

(S3) The storage apparatus 30 monitors a performance of each of the real pages (for instance, an I/O frequency (a unit is an IOPS (I/O Per Second) for instance), an data transmission amount per a unit time, and the final I/O date and time). By this configuration, a performance can be monitored for every real page that is allocated to the virtual VOL 80.

(S4) The storage apparatus 30 decides a real page of a relocation destination for every real page that has been allocated in the pool VOL 3. The real page of a relocation destination is a real page in a pool VOL other than the pool VOL 3. The relocation destination is decided based on a performance of the allocated real page (a movement source real page) for instance.

(S5) The storage apparatus 30 moves data in the allocated real page to the real page of the decided relocation destination for every real page that has been allocated in the pool VOL 3. In the illustration of FIG. 1, the storage apparatus 30 reads the data A from the external VOL 50 and moves the data A to a real page in the pool VOL 2. Similarly, the storage apparatus 30 reads the data B from the external VOL 50 and moves the data B to a real page in the pool VOL 1.

By the above sequence of processing, all data that has been stored into the external VOL 50 is displaced to at least one pool VOL other than the pool VOL 3.

After that, the external storage apparatus 40 is removed.

In the present embodiment, a target to be removed can also be at least one physical storage medium (such as a RAID group) that is included in the storage apparatus 30 as substitute for the external storage apparatus 40. In this case, as shown by the dotted line in FIG. 1 for instance, the storage apparatus 30 can include a normal VOL 60 based on at least one physical storage medium that is a target to be removed in the pool 70 and can allocate the normal VOL 60 to the virtual VOL 80. In this case, "the external storage apparatus 40" can be replaced with "at least one physical storage medium that is included in the storage apparatus 30" and the combination of "the external VOL 50" and "the pool VOL 3" can be replaced with "the normal VOL 60" in the above descriptions.

In the present embodiment, the storage apparatus 30 can execute the following processing:
(a) detects an event that means that a physical storage device (for instance, the external storage apparatus 40 or at least one physical storage medium) is removed;
(b) in the case in which the event is detected, executes S1 to S5 for the logical volume (for instance, an external VOL or a normal VOL) based on a physical storage device that is corresponded to the event.

The event can be at least one of the following for instance:
(x) the storage apparatus 30 receives the identification information of the physical storage device that is to be removed, from the management computer;
(y) the storage apparatus 30 checks a status related to a duration of life of a physical storage device on a periodic basis for every physical storage device, and decides a duration of life of one physical storage device is short as a result of the check.

In the case of (y), "one physical storage device" is "a physical storage device that is to be removed". That the duration of life is short is that a specified period of time has elapsed from an introduction time of a physical storage device or that a frequency of an occurrence of an error in the physical storage device becomes higher than a predetermined frequency for instance.

In the present embodiment, it is not necessary that at least one physical storage medium that is a basis of a logical volume that is included in the pool 70 or the external storage apparatus that is provided with an external VOL that is mapped to the logical volume is a target to be removed. For instance, at least one physical storage medium or an external storage apparatus that is specified by a management computer can be removed for instance.

The present embodiment will be described in detail in the following. In the following descriptions, a media drive (hereafter referred to a drive) will be described as an example as a physical storage medium.

Figure 2:
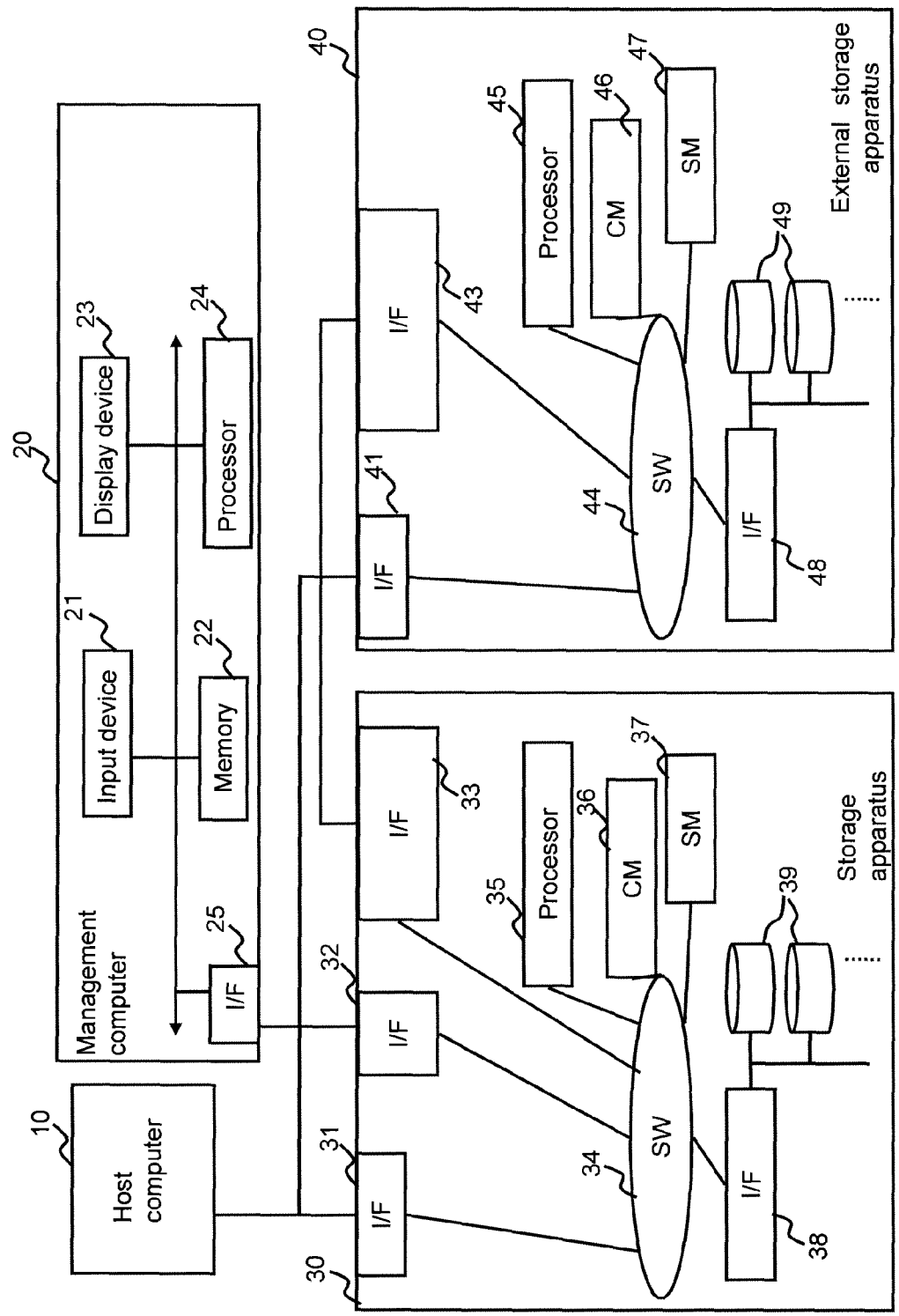
FIG. 2 is a view showing a configuration example of a storage system in accordance with an embodiment of the present invention.

FIG. 2 is a view showing a configuration example of a storage system in accordance with an embodiment of the present invention.

The storage system is provided with a host computer 10, a management computer 20, a storage apparatus 30, and an external storage apparatus 40.

The host computer 10 is a computer that is provided with a function for issuing an I/O command that is configured to read or write data. The host computer 10 is coupled to the storage apparatus 30. In addition, the host computer 10 is coupled to the external storage apparatus 40 via a host interface 41. A command that is issued from the host computer 10 is received by the external storage apparatus 40 or the storage apparatus 30.

The management computer 20 is a computer that is provided with a function for managing the storage apparatus 30 and the external storage apparatus 40. The management computer 20 is provided with an input device (such as a keyboard and a mouse) 21, a storage resource (such as a memory) 22, an output device (such as a display device) 23, and a processor (such as a CPU (Central Processing Unit)) 24 that is coupled to the input device, the storage resource, and the output device for instance.

The storage apparatus 30 is provided with a communication interface device, a plurality of drives 39, and a controller that is coupled to the communication interface device and the plurality of drives. As the communication interface device, there are a host interface 31 that is coupled to the host computer 10, a management interface 32 that is coupled to the management computer 20, and an external storage interface 33 that is coupled to the external storage apparatus 40 for instance.

There are drives 39 of a plurality of types. More specifically, there are an SSD, a drive 39, and a drive 39 for instance.

The controller is provided with a storage resource (such as a cache memory (CM)) 36 and a shared memory (SM) 37, a drive interface 38, and a processor 35 that is coupled to the storage resource and the drive interface via a switch (SW) 34 for instance.

A plurality of elements 31, 32, 33, 35, 36, 37, and 38 is coupled to the SW 34. The SW 34 switches a connection between elements that is coupled to the SW 34. A connection part of other types such as an internal bus can also be adopted as substitute for the SW 34. The CM 36 stores the data that is input to or output from the drive 39 on a temporary basis.

The SM 37 stores a program and a table of every sort and kind described later.

A plurality of drives 39 is coupled to the drive interface 38. Through the drive interface 38, data is written from the CM 36 to the drive 39, and data is read from the drive 39 to the CM 36. The descriptions of the configuration of the external storage apparatus 40 can be almost equivalent to that of the storage apparatus 30. More specifically, the external storage apparatus 40 can also be provided with a communication interface device, a plurality of drives 39, and a controller that is coupled to the communication interface device and the plurality of drives. As the communication interface device, there can be a host interface 41 that is coupled to the host computer 10 and a storage interface 43 that is coupled to the storage apparatus 30 for instance. Moreover, the controller can be provided with a storage resource (such as a cache memory (CM)) 46 and a shared memory (SM) 47), a drive interface 48, and a processor 45 that is coupled to the storage resource and the drive interface via a switch (SW) 44.

Figure 3:
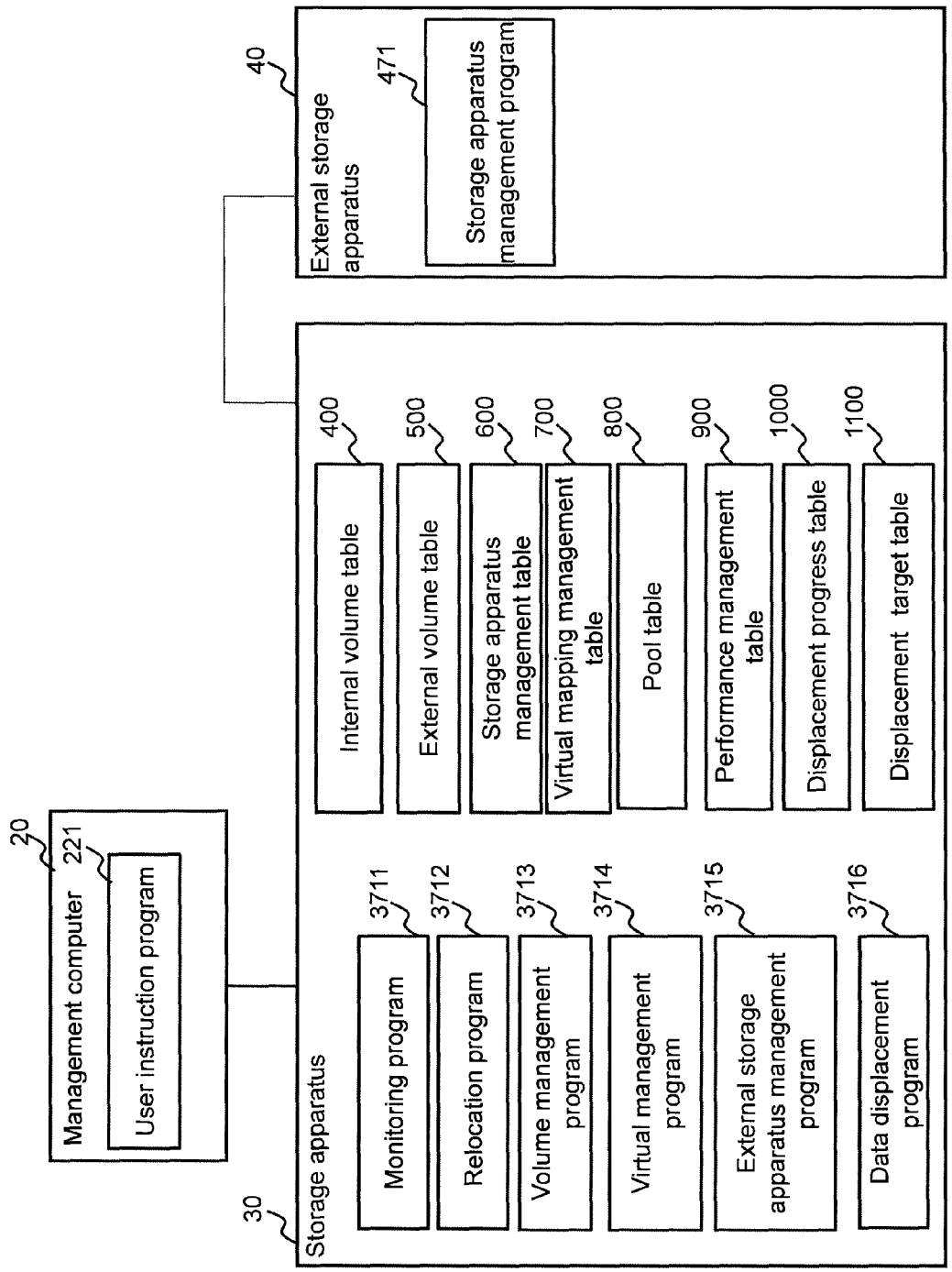
FIG. 3 is a view showing an example of a program and a table that have been stored into a memory 22, an SM 37, and an SM 47.

FIG. 3 is a view showing an example of a program and a table that have been stored into the memory 22, the SM 37, and the SM 47. A user instruction program 221 is stored into the memory 22 of the management computer 20. The user instruction program 221 transmits an instruction from a user, which is input via the input device 21, to the storage apparatus 30.

In the SM 37 of the storage apparatus 30, there are an internal VOL table 400, and external VOL table 500, a storage apparatus management table 600, a virtual mapping management table 700, a pool table 800, a performance management table 900, a displacement progress table 1000, and a relocation target table 1100 as a table for instance. In the SM 37 moreover, there are a monitoring program 3711, a relocation program 3712, a VOL management program 3713, a virtual management program 3714, an external storage apparatus management program 3715, and a data displacement program 3716 as a computer program for instance. Those programs are executed by the processor 35 in the storage apparatus 30.

The monitoring program 3711 monitors a performance of each of the real pages of the pool VOL of a monitoring target. In the present embodiment, a performance of a real page is an I/O frequency (a unit is an IOPS (Input Output per Second)). As a performance of a real page, a performance of other kinds such as a data transmission amount per a unit time can also be adopted as substitute for or in addition to the I/O frequency.

The relocation program 3712 relocates (moves) data in a real page in a pool VOL to a real page in another pool VOL.

The volume management program 3713 manages a plurality of internal volumes that are included in the storage apparatus 30.

The virtual management program 3714 manages a correspondence of a real page and a virtual page based on the virtual mapping management table 700.

The external storage apparatus management program 3715 manages the external storage apparatus 40 and an external VOL based on the external VOL table 500.

The data displacement program 3716 executes a data displacement processing based on the displacement progress table 1000 and the relocation target table 1100.

The SM 47 of the external storage apparatus 40 stores a storage apparatus management program 471. The storage apparatus management program 471 is a program that is configured to manage the storage apparatus 30.

FIG. 4 is a view showing a configuration example of the internal VOL table 400.

The internal VOL table 400 is provided with the information related to all internal VOLs that are included in the storage apparatus 30. More specifically, the internal VOL table 400 is provided with a logical VOL ID 401, a VOL type 402, a RAID group ID 403, a pool ID 404, a drive type 405, a number of rotations 406, a hierarchy rank order 407, an external VOL flag 408, and a storage ID 409 for every internal VOL for instance.

The logical VOL ID 401 is an ID of an internal VOL.

The VOL type 402 is the information that indicates a type of an internal VOL. As a type of an internal VOL, as described earlier, there can be mentioned for instance three types of a normal VOL, a virtual VOL (a virtual logical volume that complies with Thin Provisioning), and a pool VOL. A VOL type of "1" means a normal VOL, a VOL type of "2" means a virtual VOL, and a VOL type of "3" means a pool VOL. As a pool VOL, there can be a normal VOL as a member of a pool, and there can be a mapped VOL (a virtual logical VOL in which an external VOL has been mapped). As a type of an internal VOL, there can be a mapped VOL that is not included in a pool.

The RAID group ID 403 is an ID of a RAID group that is a basis of an internal VOL.

The pool ID 404 is an ID of a pool with which an internal VOL as a virtual VOL is associated or an ID of a pool that includes an internal VOL as a pool VOL.

The drive type 405 is the information that indicates a type of a drive 39 that is a basis of an internal VOL.

The number of rotations 406 is the information that indicates the number of rotations of a drive that is a basis of an internal VOL. The hierarchy rank order 407 is the information that indicates the rank order of a hierarchy that includes an internal VOL. An internal VOL that is provided with a hierarchy rank order of "1" is an internal VOL that is included in the highest hierarchy. In the present embodiment, as a hierarchy rank order is higher, an I/O performance is higher for the hierarchy. The hierarchy includes an internal VOL that conforms to a hierarchy rank order of the hierarchy (in other words, a range of an I/O performance).

The external VOL flag 408 indicates whether or not an internal VOL is a mapped VOL (a logical VOL in which an external VOL has been mapped). An external VOL flag specified as "On" means that a logical VOL is a mapped VOL, and an external VOL flag specified as "Off" means that a logical VOL is not a mapped VOL.

The storage ID 409 is an ID (for instance, a serial number) of a storage apparatus that is provided with an internal VOL. In the case in which an internal VOL is a mapped VOL, the storage ID 409 is an ID of a storage apparatus that is provided with an external VOL that has been mapped to the mapped VOL.

FIG. 5 is a view showing a configuration example of the external VOL table 500.

The external VOL table 500 is a table that is provided with the information related to an external VOL. More specifically, the external VOL table 500 is provided with an external storage ID 501, an external VOL ID 502, an external storage group ID 503, a logical VOL ID 504, a drive type 505, and a number of rotations 506 for every external VOL for instance.

The external storage ID 501 is an ID (for instance, a serial number) of an external storage apparatus 40 that is provided with an external VOL.

The external VOL ID 502 is an ID of an external VOL.

The external storage group ID 503 is an ID of a RAID group that is a basis of an external VOL.

The logical VOL ID 504 is an ID of a mapped VOL in which an external VOL has been mapped.

The drive type 505 is the information that indicates a type of a drive 49 that is a basis of an external VOL.

The number of rotations 506 is the information that indicates the number of rotations of a drive 49 that is a basis of an internal VOL.

FIG. 6 is a view showing a configuration example of the storage apparatus management table 600.

The storage apparatus management table 600 is a table that is provided with the information related to the storage apparatus 30 and the external storage apparatus 40. More specifically, the storage apparatus management table 600 is provided with a storage ID 601, a location 602, a data center 603, a model type 604, a manufacturer 605, and an introduction date 606 for every storage apparatus for instance.

The storage ID 601 is an ID of the storage apparatus 30 or the external storage apparatus 40. The predetermined mark ◉ in the column of the storage ID 601 means that a storage apparatus is the storage apparatus 30. A storage apparatus in which the predetermined mark ◉ is not added to the column of the storage ID 601 is the external storage apparatus 40.

The location 602 is the information that indicates a location in which a storage apparatus is disposed. As substitute for the location 602, the information that indicates a distance from the storage apparatus 30 can also be adopted.

The data center 603 is the identification information of a data center that is provided with a storage apparatus.

The model type 604 is the information that indicates a model type of a storage apparatus.

The manufacturer 605 is the identification information (for instance, a symbol) of a manufacturer of a storage apparatus.

The introduction date 606 is the information that indicates a date when a storage apparatus is introduced.

FIG. 7 is a view showing a configuration example of the virtual mapping table 700.

The virtual mapping table 700 shows a correspondence relationship between a real page and a virtual page. The virtual mapping table 700 exists for every pool VOL.

The virtual mapping table 700 is a table that is provided with a real page ID 701 and a virtual page ID 702 for every real page for instance.

The real page ID 701 is an ID of a real page.

The virtual page ID 702 is an ID of a virtual page that has been allocated to a real page. The ID of a virtual page can include an ID of a virtual VOL that is provided with the virtual page. By this configuration, a virtual page to which a real page has been allocated and a virtual VOL of the virtual page can be found.

FIG. 8 is a view showing a configuration example of the pool table 800.

The pool table 800 is a table that is provided with the information related to each pool VOL. More specifically, the pool table 800 is provided with a pool ID 801, a pool VOL ID 802, a format inhibition flag 803, a displacement flag 804, and a monitoring flag 805 for every pool VOL for instance.

The pool ID 801 is an ID of a pool that includes a pool VOL. The pool VOL ID 802 is an ID of a pool VOL.

The format inhibition flag 803 is a flag that indicates whether or not a pool VOL is a format inhibition target. The format inhibition flag 803 of "On" means that a pool VOL is a format inhibition target and data is not moved from a pool VOL to another pool VOL in the relocation processing. In the case in which a logical VOL is a format inhibition target, even if the logical VOL is included in a pool, the logical VOL is not formatted.

Consequently, the data that is included before the logical VOL is included in a pool remains without any change. Therefore, in the case in which a mapped VOL of a format inhibition target is included in a pool and is allocated to the virtual VOL 80 (that is, in the case in which the (S1) and (S2) shown in FIG. 1 are executed) for instance, the host computer 10 can read the data in a mapped VOL that is included in a pool (the data in an external VOL that has been mapped to the mapped VOL) by transmitting a read command that specifies the virtual VOL 80. Moreover in the relocation processing, even in the case in which a real page in a pool VOL that is provided with the format inhibition flag 803 of "On" conforms to the condition of a real page of a movement source, a real page in a pool VOL that is provided with the format inhibition flag 803 of "On" is not decided as a real page of a movement source. The displacement flag 804 is a flag that indicates whether or not a pool VOL is a displacement target. The displacement flag 804 of "On" means that a pool VOL is a displacement target. For a real page in a pool VOL that is provided with the displacement flag 804 of "On", data is not moved from a real page in another pool VOL in the relocation processing. In other words, a real page in a pool VOL that is provided with the displacement flag 804 of "On" is not made to be a relocation destination of data in the relocation processing.

The monitoring flag 805 is a flag that indicates whether or not a pool VOL is a monitoring target. The monitoring flag 805 specified as "On" means that a pool VOL is a monitoring target.

The information that indicates whether or not a pool VOL is a format inhibition target, the information that indicates whether or not a pool VOL is a displacement target, and the information that indicates whether or not a pool VOL is a monitoring target are not restricted to a flag as described above, and can also be the information of the other kinds.

FIG. 9 is a view showing a configuration example of the performance management table 900.

The performance management table 900 is a table that is provided with the information that indicates the result of a monitoring for a pool VOL of the monitoring flag 805 of "On". The performance management table 900 exists for every pool VOL of the monitoring flag 805 of "On".

The performance management table 900 is provided with a real page ID 901, a date and time 902, and a performance 903 for every real page for instance.

The real page ID 901 is an ID of a real page.

The date and time 902 is the information that indicates the latest date and time when a real page was monitored.

The performance 903 is the information that indicates the performance of a real page. For instance, the performance of a real page can be an I/O frequency (a unit is an IOPS (Input Output per Second)). As the performance of a real page, at least one of a data transmission amount per a unit time and a response time can also be adopted as substitute for or in addition to the I/O frequency. The performance can also be monitored for every virtual page as substitute for being monitored for every real page. In other words, the information that indicates the performance can also be recorded for every virtual page.

FIG. 10 is a view showing a configuration example of the displacement progress table 1000.

The displacement progress table 1000 exists for every pool VOL of the displacement flag 804 of "On".

The displacement progress table 1000 is provided with a real page ID 1001, a relocation destination real page ID 1002, and a displacement completion flag 1003 for every real page for instance. The real page ID 1001 is an ID of a real page.

The relocation destination real page ID 1002 is an ID of a real page that is a movement destination (a relocation destination) of data that has been stored into a real page. In a quintessential way, a real page of a movement destination is a real page in a pool VOL that is different from a pool VOL that is provided with a real page of a movement source. More specifically, a real page of a movement destination is a real page in a pool VOL that is included in a hierarchy that is different from a hierarchy that includes a pool VOL that is provided with a real page of a movement source for instance.

The displacement completion flag 1003 is a flag that indicates whether or not a movement (a displacement) of data in a real page has been completed. The displacement completion flag 1003 of "On" means that a movement of data in a real page has been completed and the displacement completion flag 1003 of "Off" means that a movement of data in a real page has not been completed.

FIG. 11 is a view showing a configuration example of the relocation target table 1100.

The relocation target table 1100 is a table that indicates a priority level of each of the real pages for a pool that includes a pool VOL of a monitoring target. The relocation target table 1100 exists for every pool that includes a pool VOL of the monitoring flag 805 of "On".

The relocation target table 1100 is provided with a real page ID 1101 and a priority level 1102 for instance.

The real page ID 1101 is an ID of a real page.

The priority level 1102 is the information that indicates a priority level of a real page. A priority level of a real page is assigned based on a performance (a monitoring result) for every real page in a pool that includes the real page. As a performance that is indicated by the performance 904 (the information in the performance management table 900 (see FIG. 9)) that is corresponded to the real page is more excellent for instance, the priority level of a real page is higher. As the priority level is higher, a smaller value is assigned.

The processing that is executed in the present embodiment will be described in the following.

Figure 12:
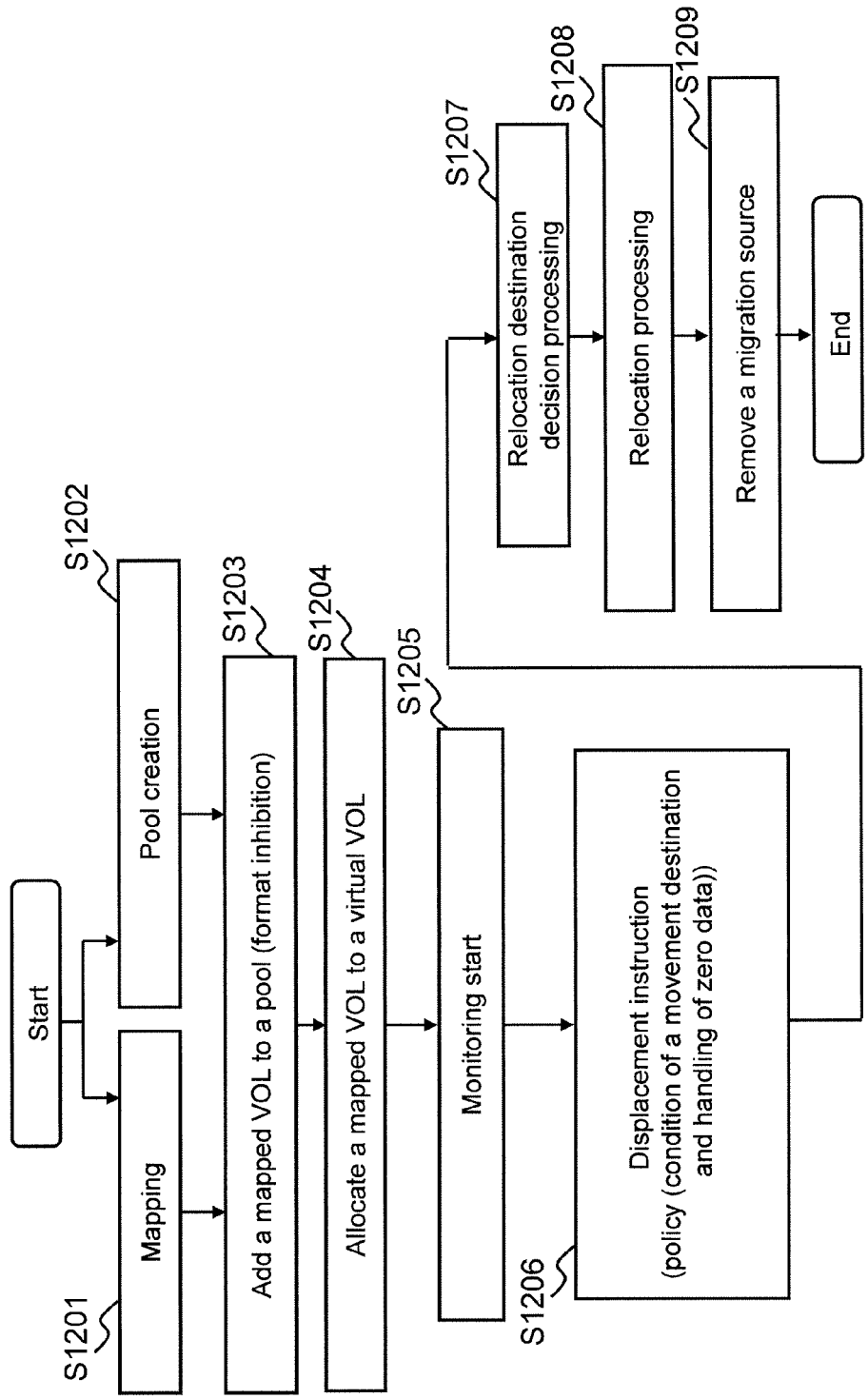
FIG. 12 is a flowchart showing an example of an entire flow of a processing that is executed in accordance with an embodiment of the present invention.

FIG. 12 is a flowchart showing an example of an entire flow of a processing that is executed in accordance with an embodiment of the present invention.

The storage apparatus 30 executes a mapping of an external VOL to an internal VOL (S1201).

The storage apparatus 30 creates a pool (S1202).

The storage apparatus 30 adds an internal VOL in which an external VOL has been mapped (a mapped VOL) to a pool (S1203). The mapped VOL that has been added to the pool is a format inhibition target, a displacement target, and a monitoring target.

The storage apparatus 30 creates a virtual VOL and allocate a mapped VOL in a pool to the virtual VOL (S1204).

The storage apparatus 30 monitors a performance of each of the real pages of the mapped VOL (the pool VOL) that has been allocated to the virtual VOL (S1205).

The storage apparatus 30 receives a displacement instruction from the management computer 20 (S1206). The displacement instruction includes an ID of a storage apparatus, an ID of a virtual VOL and/or a pool VOL, and the policy information for instance. A pool VOL that is a displacement target is specified by an ID of a storage apparatus and an ID of a virtual VOL and/or a pool VOL. Moreover, a real page of a movement destination is decided for every real page (a real page that is provided with the valid data) in a pool VOL of a displacement target based on the policy information. The "policy information" is the information that indicates a policy related to a decision of a real page of a movement destination.

The policy information includes at least one of the following information for instance:

a real page attribute that is configured to make allowance in the case in which a real page of a movement destination is decided (for instance, a performance of a real page, and a data center, a location, or an introduction date for a storage apparatus that is provided with a real page);

a condition of an attribute of a real page of a movement destination (for instance, an ID of a data center, the information that indicates a location, or whether or not a real page based on a physical storage medium in the storage apparatus 30 can be a real page of a movement destination); and whether or not the zero data is discarded.

The storage apparatus 30 decides a movement destination (a relocation destination) of data for each of the real pages in a pool VOL of a displacement target (S1207). In the case in which the policy information includes the information that indicates that the zero data is discarded, for a real page in which only zero data has been stored, the zero data in the real page is discarded (the real page is not made to be a movement source and is managed as an unallocated real page), and a real page of a movement destination is not decided.

The storage apparatus 30 moves (relocates) data from each real page of a movement source in a pool VOL of a displacement target to a real page of a movement destination that has been decided for the real page (S1208). In the case in which a pool VOL of a displacement target is a mapped VOL, data is moved from an area that is corresponded to a real page of a movement source in an external VOL to a real page of a movement destination.

After all valid data is displaced from a pool VOL of a displacement target (after a movement of data is completed for each real page of a movement source), the external storage apparatus 40 that is provided with an external VOL that has been mapped to a pool VOL of a displacement target is removed (S1209). In the case in which a pool VOL of a displacement target is a VOL based on at least one drive 39 that is included in the storage apparatus 30, the at least one drive 39 is removed.

Figure 13:
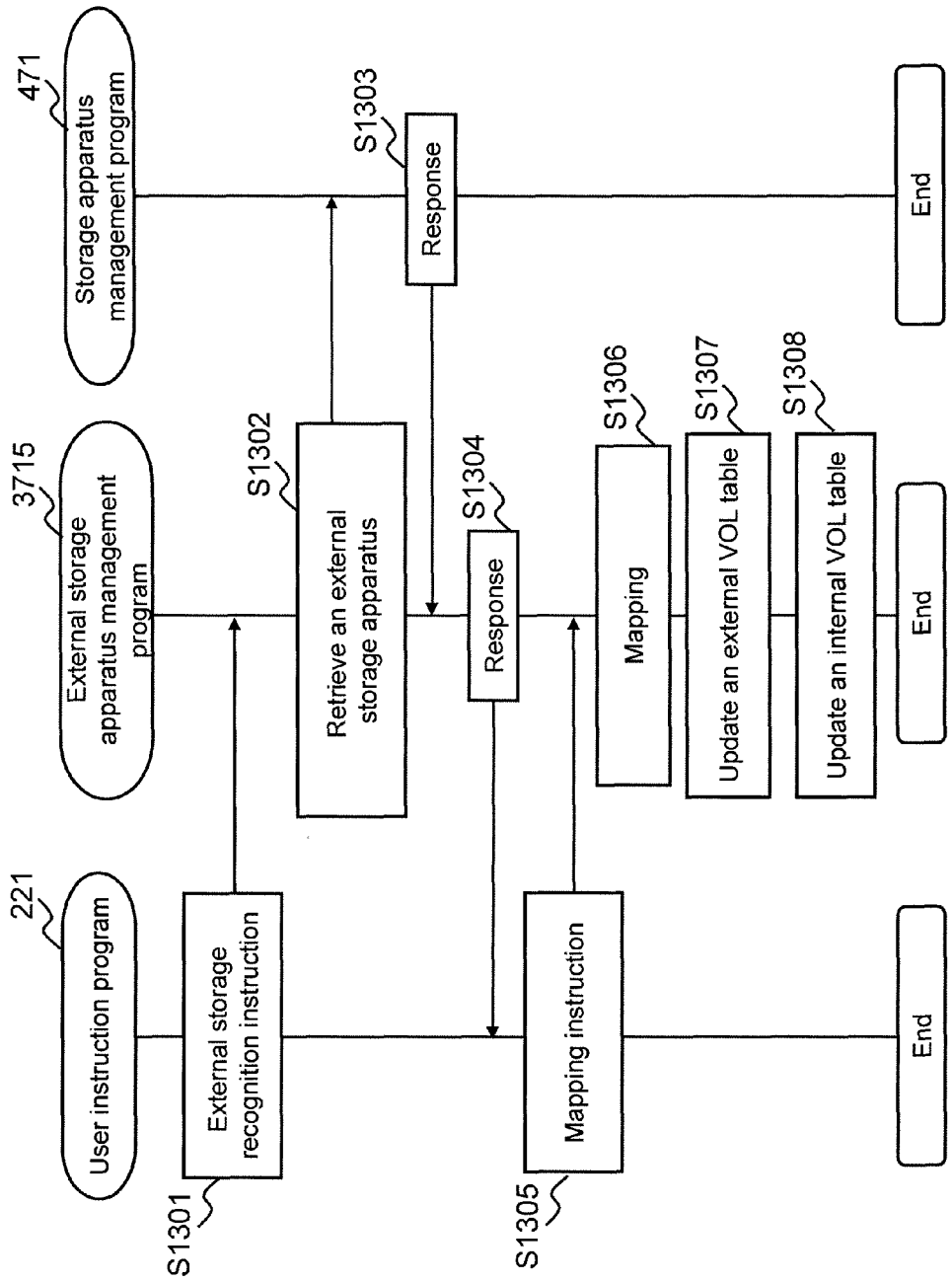
FIG. 13 is a flowchart showing a flow of a mapping processing.

FIG. 13 is a flowchart showing a flow of a mapping processing. The mapping processing is a processing that is executed in the above described S1201.

The user instruction program 221 transmits an instruction for recognizing the external storage apparatus 40 (hereafter referred to as an external storage recognition instruction) to an external storage apparatus management program 3715 (S1301).

The external storage apparatus management program 3715 receives the external storage recognition instruction, and executes an external storage retrieval processing to specify all external storage apparatuses that are coupled to the storage apparatus 30 in accordance with the instruction (S1302). The external storage apparatus management program 3715 issues the predetermined enquiry in the retrieval processing.

In the case in which an apparatus that has received the issuance is an external storage apparatus, the storage apparatus management program 471 of the external storage apparatus returns a response to the storage apparatus 30 that is an issuance source of the enquiry (S1303). The response can include the information related to the external storage apparatus 40 that returns the response (for instance, the identification information of the external storage apparatus 40 and the identification information of an external VOL that is included in the external storage apparatus 40).

The external storage apparatus management program 3715 in the storage apparatus 30 that has received the response returns a response to the external storage recognition instruction to the user instruction program 221 (S1304). The response can include the whole or a part of the information that is included in a response that has been returned by the external storage apparatus 40 (for instance, the identification information of each external storage apparatus 40 that has returned the response and the identification information of an external VOL that is included in the external storage apparatus 40).

The user instruction program 221 recognizes the external storage apparatus 40 by receiving the response. The user instruction program 221 issues an instruction for mapping an external VOL (hereafter referred to as a mapping instruction) to the external storage apparatus management program 3715 (S1305). The mapping instruction can include the identification information of the external storage apparatus 40 that is a removal target.

The external storage apparatus management program 3715 receives a mapping instruction, and maps all external VOLs of the external storage apparatus 40 that is specified by the instruction (or an external VOL that has been specified by the instruction) to an internal VOL in accordance with the instruction (S1306). In the S1306, the external storage apparatus management program 3715 executes the following processing for instance:

adds a new record to the external VOL table 500 (see FIG. 5) and registers the information related to the external VOL that has been mapped to the added record;

adds a new record to the internal VOL table 400 and registers the information related to the mapped VOL to the added record; and updates an external VOL table the external VOL flag 406 that is corresponded to an internal VOL in which the external VOL has been mapped (a flag 406 in the internal VOL table 400 (see FIG. 4)) to be "On".

Figure 14:
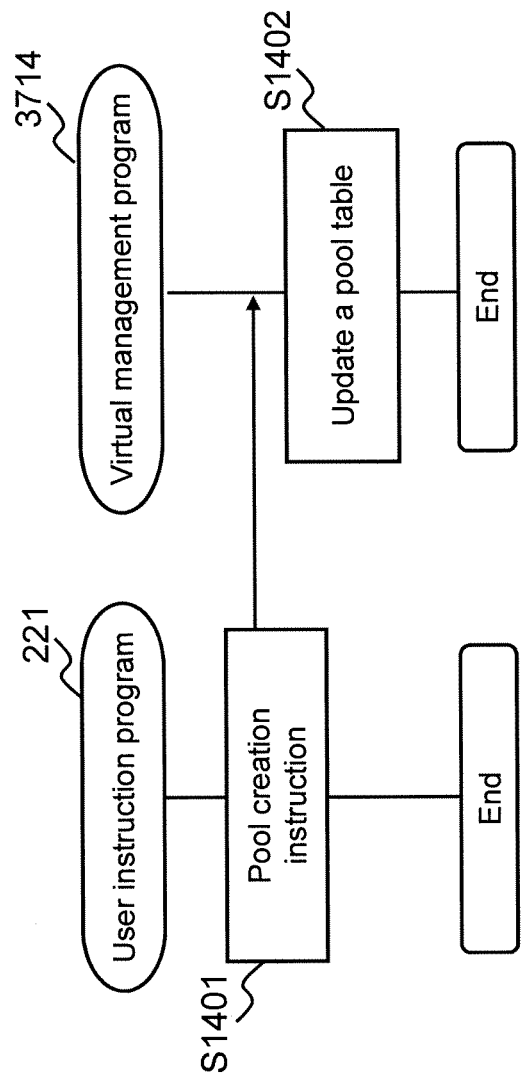
FIG. 14 is a flowchart showing a flow of a pool creation processing.

FIG. 14 is a flowchart showing a flow of a pool creation processing. The pool creation processing is a processing that is executed in the above described S1202.

The user instruction program 221 transmits an instruction for creating a pool (hereafter referred to as a pool creation instruction) to a virtual management program 3714 (S1401).

The virtual management program 3714 receives the pool creation instruction, and updates a pool table 800 (see FIG. 8) in accordance with the instruction (S1402). More specifically, the virtual management program 3714 adds a record that is corresponded to a new pool to the pool table 800 for instance. The added record can be a blank in the case in which a pool VOL has not been added.

Figure 15:
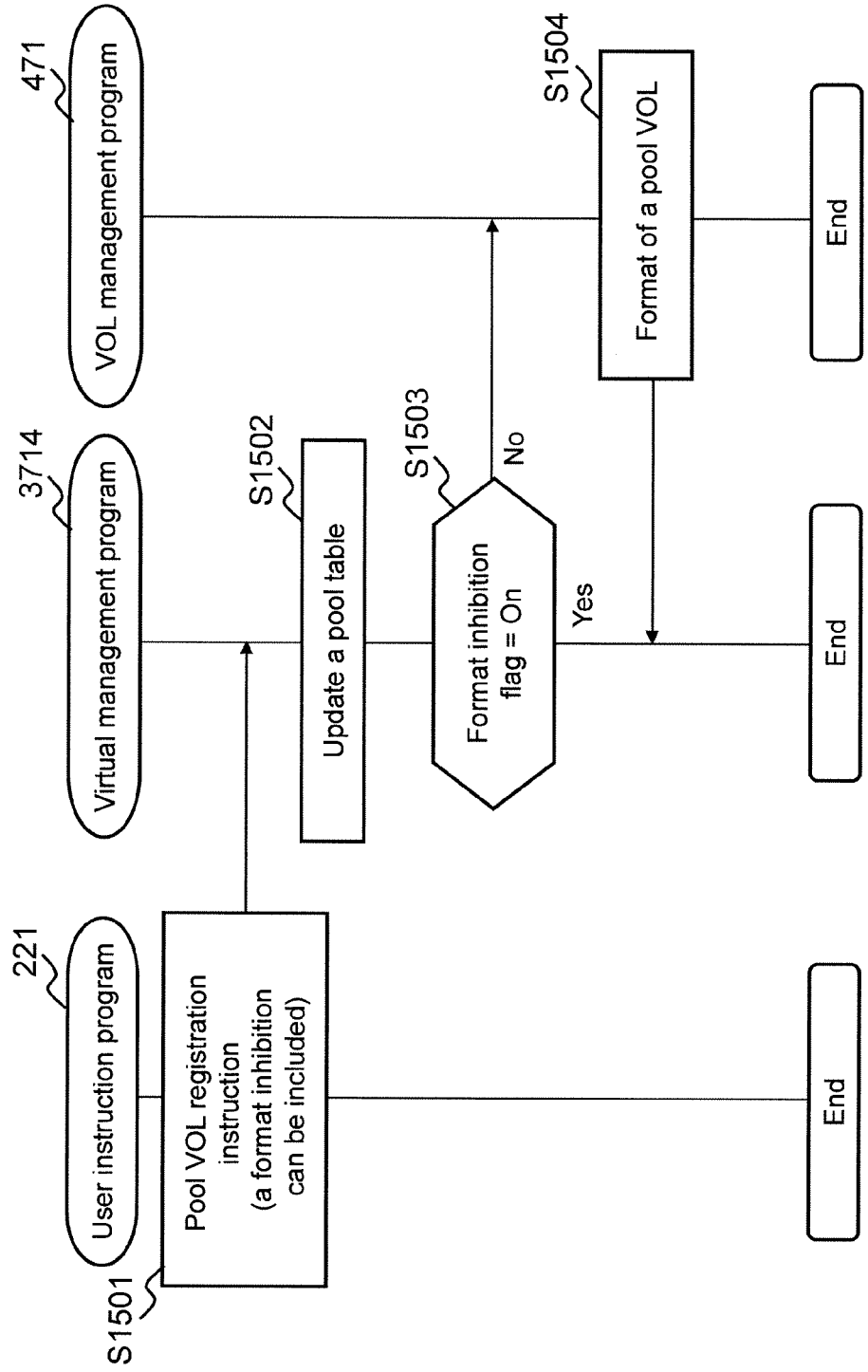
FIG. 15 is a flowchart showing a flow of a pool VOL registration processing.

FIG. 15 is a flowchart showing a flow of a pool VOL registration processing. The pool VOL registration processing is a processing that is executed in the above described S1202.

The user instruction program 221 transmits an instruction for adding a VOL to a pool (hereafter referred to as a pool VOL registration instruction) to a virtual management program 3714 (S1501). This instruction is an instruction for adding a VOL that is not included in a pool to a pool. In this case, the pool VOL registration instruction can include the information related to at least one VOL of an adding target (an adding VOL in the description of FIG. 15). Regardless of that an adding VOL is a normal VOL or a mapped VOL, in the case in which there is an adding VOL in which the format inhibition flag 803 is to be specified as "On", the information that indicates that the format inhibition flag 803 is specified as "On" (for instance, the information that indicates an adding VOL that has been specified to being provided to the host as a virtual VOL) can be included in the pool VOL registration instruction for at least one adding VOL. In addition, the pool VOL registration instruction can include the information that indicates whether a monitoring flag is made to be "On" or "Off" for each adding VOL. The virtual management program 3714 receives the pool VOL registration instruction, and updates a pool table 800 (see FIG. 8) in accordance with the instruction (S1502). In this stage, a record of each adding VOL that complies with the pool VOL registration instruction is added to the pool table 800, and the information of the adding VOL that is corresponded to the record (the information that complies with the pool VOL registration instruction) is registered to each record. By this configuration, an adding VOL becomes a pool VOL. An adding VOL is divided into at least two real pages. For a VOL in which the format inhibition flag 803 is specified as "On", "On" is registered as the format inhibition flag 803. In this stage, a displacement flag 804 can be "Off" for all VOLs that comply with the pool VOL registration instruction. In the case in which a displacement processing is started as described later, a displacement flag 804 is made to be "On" for a pool VOL of a displacement target (for instance, a VOL that is a mapped VOL and that is a format inhibition target). In the case of adding of a VOL that is corresponded to a mapped VOL, the virtual management program 3714 can make the format inhibition flag 803 to be "On" even in the case in which the pool VOL registration instruction does not specify that the format inhibition flag 803 is made to be "On" for the VOL.

The virtual management program 3714 checks whether or not the format inhibition flag 803 is specified as "On" for the added pool VOL (S1503). In the case in which the format inhibition flag 803 is specified as "On" for the pool VOL (S1503: Yes), the processing is terminated.

In the case in which the format inhibition flag 803 is specified as "Off" for the pool VOL (S1503: No), the virtual management program 3714 transmits an instruction for formatting the pool VOL to the volume management program 471, and the volume management program 471 receives the instruction and formats the pool VOL in accordance with the instruction (S1504).

Figure 16:
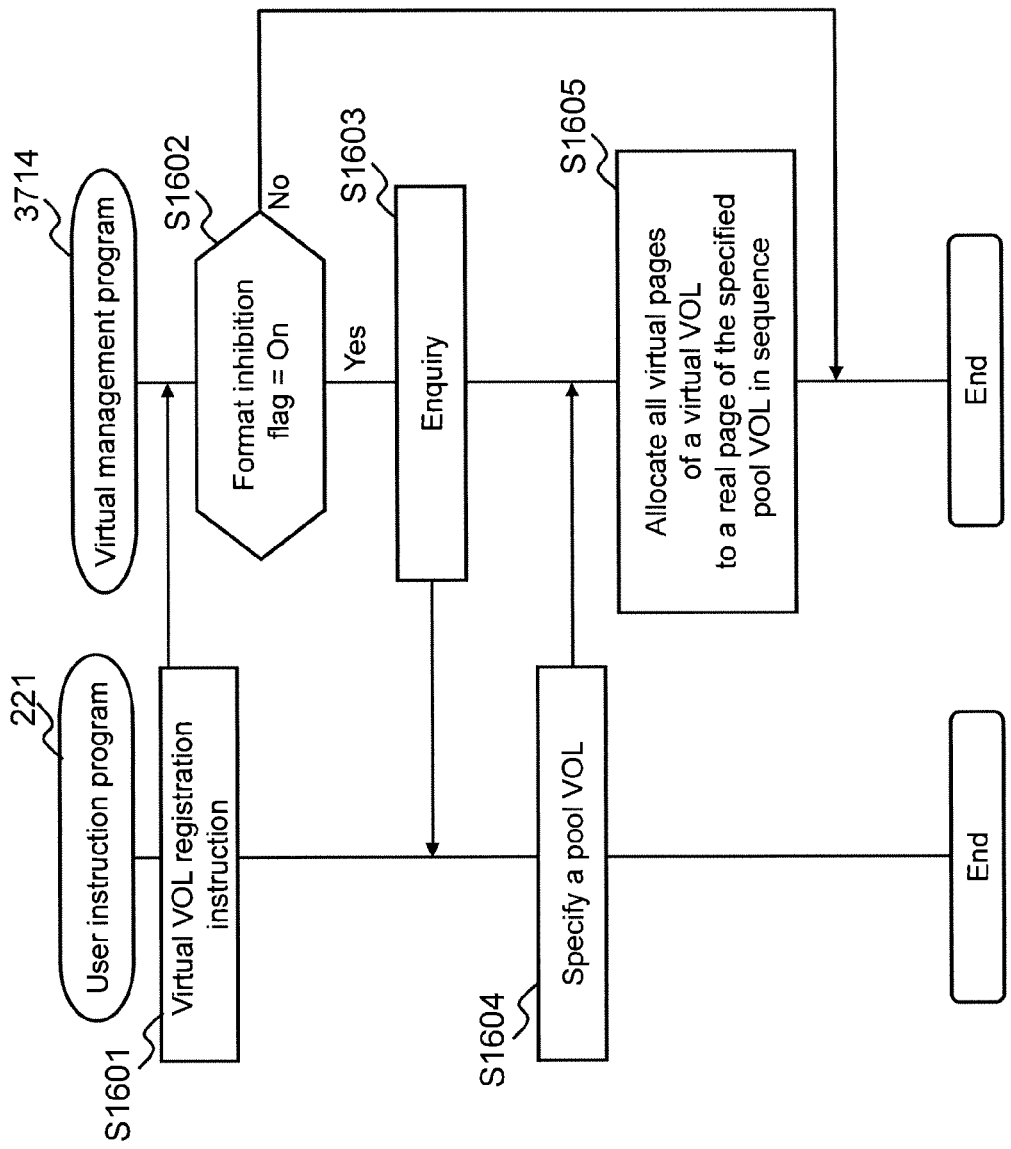
FIG. 16 is a flowchart showing a flow of a virtual VOL registration processing.

FIG. 16 is a flowchart showing a flow of a virtual VOL registration processing. The virtual VOL registration processing is a processing that can be executed in the above described S1204. The user instruction program 221 transmits an instruction for registering a virtual VOL (hereafter referred to as a virtual VOL registration instruction) to the virtual management program 3714 (S1601).

The virtual management program 3714 receives the virtual VOL registration instruction, and judges whether or not the instruction includes the information that indicates a pool VOL in which the format inhibition flag 803 is specified as "On" is allocated (S1602).

In the case in which the result of the judgment of S1602 is positive (S1602: Yes), the virtual management program 3714 transmits an enquiry of an ID of a pool VOL to the user instruction program 221 (S1603).

The user instruction program 221 receives the enquiry, and transmits a response that includes an ID of a pool VOL in which the format inhibition flag 803 is specified as "On" to the virtual management program 3714 for the enquiry (S1604). The ID is an ID that has been specified by a user for instance.

The virtual management program 3714 receives the response, and allocates all real pages that configure a pool VOL that is specified from the response that has been received to all virtual pages of a virtual VOL that complies with the virtual VOL registration instruction (S1606). In this case, the virtual management program 3714 updates the virtual mapping table 700 (see FIG. 7).

On the other hand, in the case in which the result of the judgment of S1602 is negative (S1602: No), the processing is terminated. As a result, a virtual VOL in which data has not been stored is created.

In this processing, the virtual VOL registration instruction can include an ID of a pool VOL that is allocated to a virtual VOL for instance. In this case, the virtual management program 3714 can execute the S1605 without executing the S1602 to S1604.

FIG. 17A is a flowchart showing a flow of a monitoring validation processing.

The user instruction program 221 transmits an instruction for validating a monitoring (hereafter referred to as a validation instruction) to the virtual management program 3714 (S1701). The instruction can include an ID of a VOL of a monitoring target. The virtual management program 3714 receives the validation instruction, and specifies a monitoring flag 805 of a pool VOL that is specified by the instruction as "On" in accordance with the instruction (S1702).

The monitoring program 3711 specifies a pool VOL in which the monitoring flag 805 is specified as "On" from a pool table 800, and starts a monitoring of a performance for every real page that configures the pool VOL (S1703).

The monitoring program 3711 update a performance 903 of a performance table 900 (see FIG. 9) based on the monitoring result (S1704).

FIG. 17B is a flowchart showing a flow of a monitoring invalidation processing.

The user instruction program 221 transmits an instruction for invalidating a monitoring (hereafter referred to as an invalidation instruction) to the virtual management program 3714 (S1711). The instruction can include an ID of a VOL of a non-target of a monitoring.

The virtual management program 3714 receives the invalidation instruction, and specifies a monitoring flag 805 of a pool VOL that is specified by the instruction as "Off" in accordance with the instruction (S1712).

Figure 18:
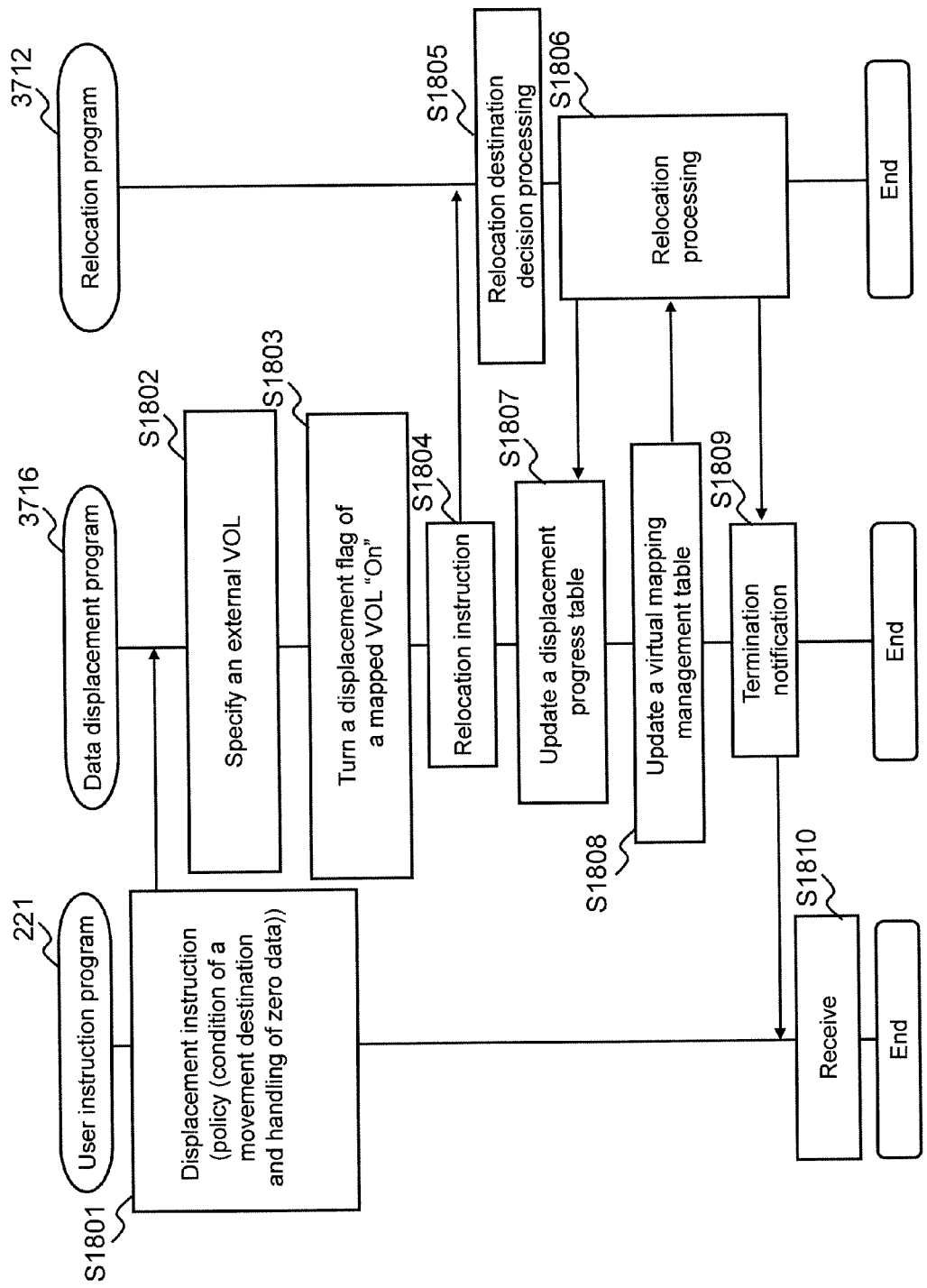
FIG. 18 is a flowchart showing a flow of a displacement processing in a unit of a storage apparatus.

The monitoring program 3711 terminates a monitoring for a pool VOL in which the monitoring flag 805 is specified as "Off" (S1713). FIG. 18 is a flowchart showing a flow of a displacement processing in a unit of a storage apparatus. The displacement processing is a processing that is included in the above described S1206 to S1208. The user instruction program 221 transmits a displacement instruction to a displacement program 3716 (S1801). This instruction can include an ID (such as a serial number) of a storage apparatus that is a displacement target (a displacement source (a movement source) of the data) and the information related to a policy of the relocation (the policy information). The policy information can include at least one of the condition of an attribute related to a real page of a movement destination and whether or not the zero data is discarded while the data displacement is not executed for a real page of a movement source in the case in which the real page of a movement source stores only the zero data. The condition of an attribute related to a real page of a movement destination can include the information that indicates at least one of the following items for instance:

whether or not a real page of a movement destination is made to be a real page that belongs to a performance (IOPS) of a real page of a movement source (that is, whether or not a relocation processing (a data movement between real pages) based on a performance is executed);

a condition related to at least one of a manufacturer, a data center, a location, an ID (such as a serial number), a model type, and an introduction data of a storage apparatus that includes a real page of a movement destination;

a condition related to a type and/or the number of rotations of a drive that is a basis of a real page a movement destination; and whether or not a storage apparatus 30 is made to be a movement destination.

Figure 19:
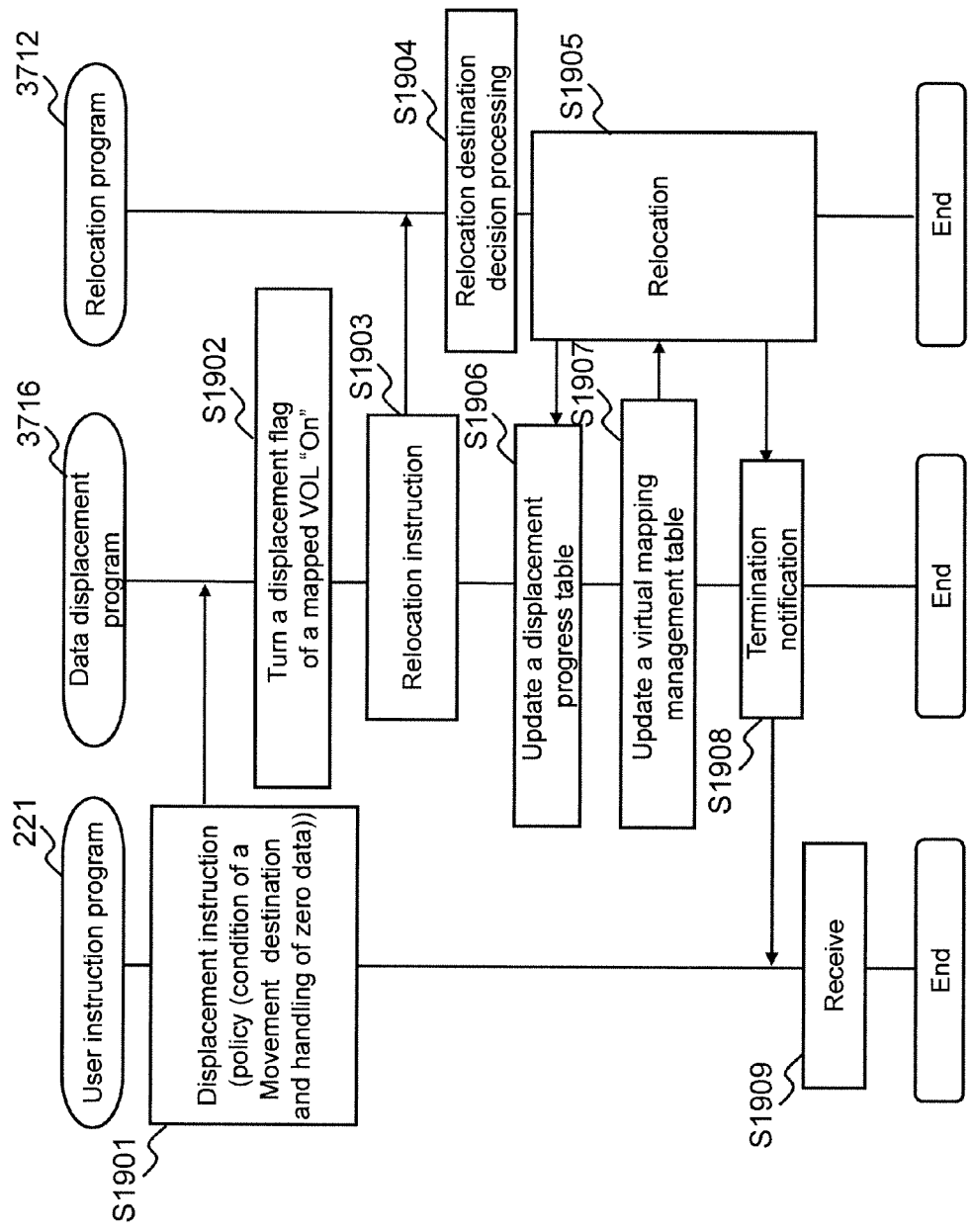
FIG. 19 is a flowchart showing a flow of a displacement processing in a unit of a VOL.

This is similar for a displacement processing in a VOL unit (see FIG. 19 described later).

The displacement program 3716 receives the displacement instruction, and specifies all external VOLs that are included in a storage apparatus of a displacement target from the external VOL table 500 (see FIG. 5) in accordance with the instruction (S1802).

The displacement program 3716 specifies a displacement flag 804 of a pool VOL that is corresponded to the specified external VOL to be "On" (S1803). A pool VOL that is provided with a displacement flag 804 of "On" is referred to as a pool VOL of a displacement target.

The displacement program 3716 transmits a relocation instruction that complies with the policy information to a relocation program 3712 (S1804).

The relocation program 3712 receives the relocation instruction, and executes a relocation destination decision processing in accordance with the instruction (S1805). More specifically, the relocation program 3712 decides a real page of a relocation destination (a real page of a movement destination) for every real page of a pool VOL of a displacement target.

The relocation program 3712 executes a relocation processing (S1806). In the relocation processing, data is moved to a real page of a relocation destination that has been decided for every real page of a pool VOL of a displacement target. In the case in which the policy information includes the information that indicates that the zero data is discarded while the data displacement is not executed for a real page of a movement source in the case in which the real page of a movement source stores only the zero data, when the real page of a movement source stores only the zero data, the data movement is not executed for the real page. The real page is managed as an unallocated real page without executing a data movement. It is thought that this is effective in particular in the case in which a pool VOL of a displacement target is a mapped VOL. This is because a real page that has stored only the zero data may be allocated to a virtual page in some case in the case in which a real page of a mapped VOL is allocated to all virtual pages of a virtual VOL respectively. In the case in which a real page of a mapped VOL is allocated to all virtual pages of a virtual VOL, although an unallocated real page is consumed more than is necessary, it is thought that there is a merit as described below. That is, in the case in which a plurality of virtual VOLs is associated with a pool and a real page is dynamically allocated to another virtual VOL, a real page in a mapped VOL can be prevented from being allocated to another virtual VOL.

The relocation program 3712 transmits the progress information (for instance, the information that indicates from which a real page of a movement source to which a real page of a movement destination a data movement is completed) to the displacement program 3716 in an appropriate manner (for instance, every time when a data movement is completed from one real page of a movement source to one real page of a movement destination). The displacement program 3716 receives the progress information, and modifies a displacement completion flag 1003 to be "On" based on the information in the case in which a data movement has been completed for a real page in which the displacement completion flag 1003 is "Off" (S1807). The displacement program 3716 update a virtual mapping management table 700 (see FIG. 7) in such a manner that a real page of a movement destination as substitute for a real page of a movement source is allocated to a virtual page that has been allocated to a real page of a movement source in which a data movement has been completed (S1808).

The relocation program 3712 transmits the termination information that indicates a termination to the displacement program 3716 in the case in which the relocation processing is terminated.

The displacement program 3716 transmits the displacement completion notification to the user instruction program 221 in the case in which the displacement program 3716 receives the termination information (S1809).

The user instruction program 221 receives s the displacement completion notification from the displacement program 3716 (S1810). FIG. 19 is a flowchart showing a flow of a displacement processing in a unit of a VOL. The displacement processing is also a processing that is included in the above described S1206 to S1208.

The displacement processing in a unit of a VOL is basically equivalent to the displacement processing in a unit of a storage apparatus. More specifically, although the displacement processing in a unit of a storage apparatus includes a processing for searching an external VOL that is included in the storage apparatus (S1802), since a displacement instruction includes an ID of a pool VOL of a displacement source for the displacement processing in a unit of a VOL, a processing that is corresponded to the S1802 is not required in essence. Consequently, the S1901 to S1909 of FIG. 19 are corresponded to the S1801 and the S1803 to S1810 of FIG. 18, respectively.

In the next place, the flow of the relocation destination decision processing (S1805 and S1904) will be described. The flow of the relocation destination decision processing is different depending on the policy information. The flow of the relocation destination decision processing includes flows of the three types that are corresponded to the following cases of the three types in general terms:

(1) a case in which the policy information includes the information that indicates that a relocation processing (a data movement between real pages) based on a performance is executed (a case of the first kind);

(2) a case in which the policy information includes a condition related to at least one of a manufacturer, a data center, a location, an ID (such as a serial number), a model type, and an introduction data of a storage apparatus that includes a real page of a movement destination (a case of the second kind); and (3) a case in which the policy information includes a condition related to a type and/or the number of rotations of a drive that is a basis of a real page a movement destination (a case of the third kind).

Figure 20:
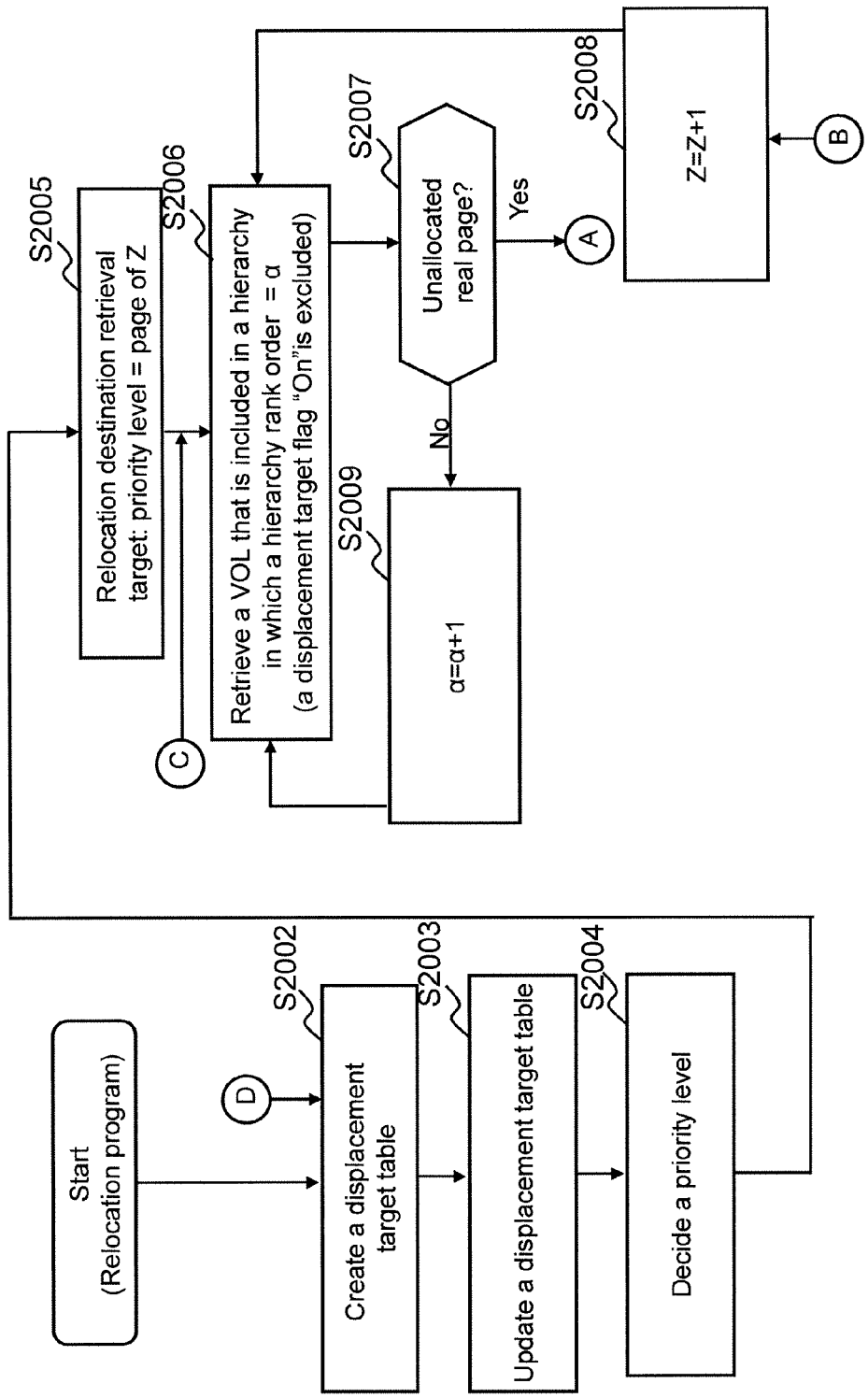
FIG. 20 is a part of a flowchart showing an example of a flow of a relocation destination decision processing in accordance with a case of the first kind.
Figure 21:
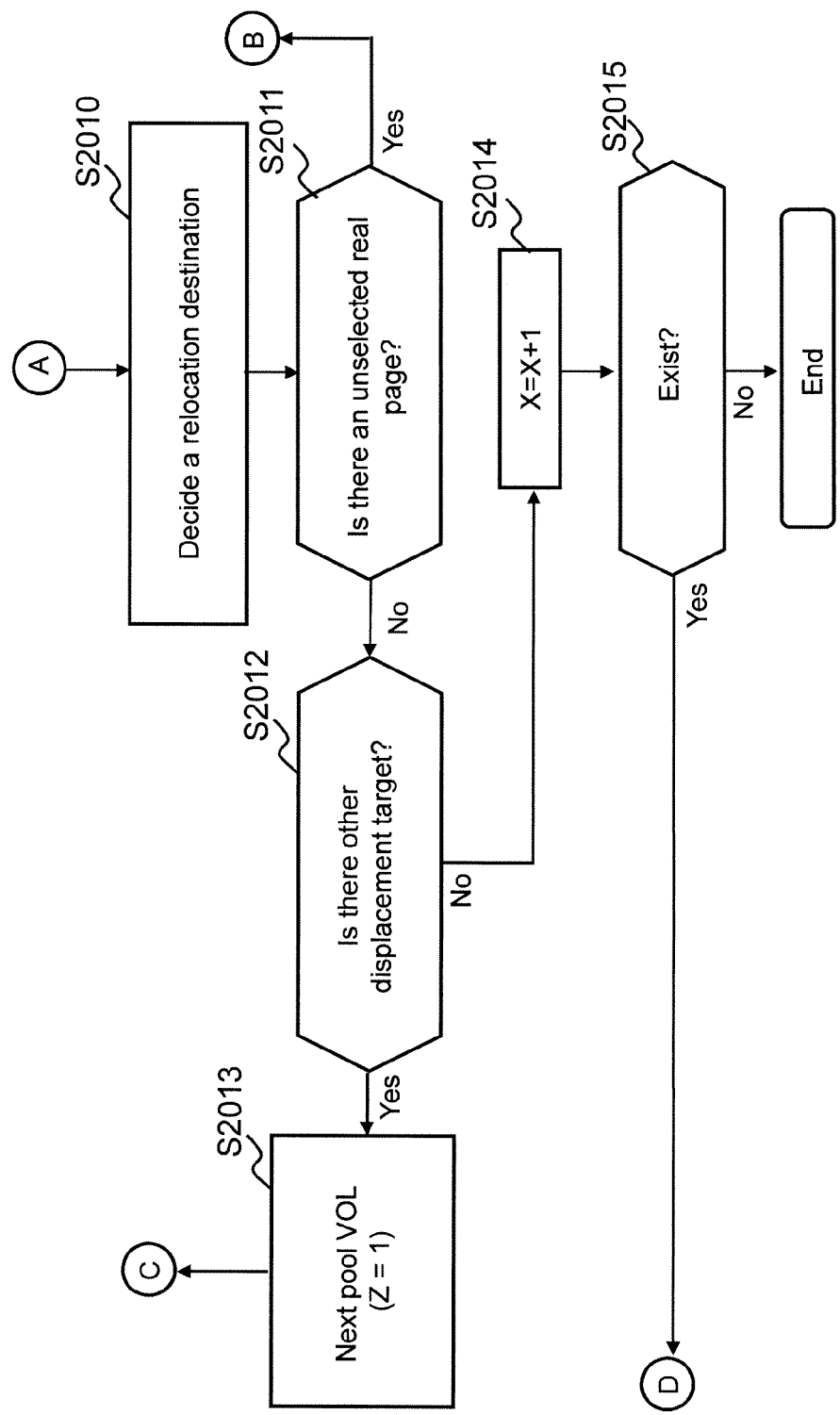
FIG. 21 is a remaining part of a flowchart showing an example of a flow of a relocation destination decision processing in accordance with a case of the first kind.

FIG. 20 and FIG. 21 are the flowcharts showing an example of a flow of a relocation destination decision processing in accordance with a case of the first kind. In the following descriptions, to make the descriptions to be more simple, an ID of a pool that includes a pool VOL of a displacement target is X (X is an integer number equal to or larger than 1), a hierarchy rank order 407 is α (α is an integer number equal to or larger than 1), and a priority level 1102 of a real page is Z (Z is an integer number equal to or larger than 1). The initial value of X, α, and Z in the following processing is "1". In the present embodiment, a value of a pool ID is a serial number starting with 1.

The relocation program 3712 searches a pool VOL in which the displacement flag 804 is "On" for a pool in which a pool ID is X based on the pool table 800, and creates the displacement progress table 1000 for every found pool VOL of a displacement target (S2002). At this time, in the case in which the policy information includes the information that indicates that the zero data is discarded while the data displacement is not executed for a real page of a movement source in the case in which the real page of a movement source stores only the zero data and the pool VOL is a pool VOL that has been configured by only a real page that has stored only the zero data, the displacement progress table 1000 is not created for the pool VOL.

The relocation program 3712 registers the information related to each of real pages that configure the pool VOL that is corresponded to the displacement progress table 1000 into the displacement progress table 1000 that has been created in the S2002 (S2003). At this time, in the case in which the policy information includes the information that indicates that the zero data is discarded while the data displacement is not executed for a real page of a movement source in the case in which the real page of a movement source stores only the zero data, the information related to a real page that has stored only the zero data is not registered into the displacement progress table 1000.

The relocation program 3712 creates a displacement target table 1100 that is corresponded to a pool in which a pool ID is X, and adds a record for every real page ID that has been registered to the displacement progress table 1000. The relocation program 3712 specifies the performance 903 of each of real pages in which a real page ID has been registered to the displacement target table 1100, and registers a smaller value as the priority level 1102 (a value that indicates a higher priority level) as a value of the performance 903 is higher for the real page (as an I/O frequency is higher) (S2004).

The relocation program 3712 selects one VOL arbitrarily from at least one displacement target VOL that has been found in the S2002, and makes a real page in which the priority level is Z to be a relocation destination retrieval target for the pool VOL that has been selected (hereafter referred to as a selected pool VOL) (S2005).

The relocation program 3712 retrieve a VOL that is included in a hierarchy in which a hierarchy rank order 407 is α and that is included in a pool in which a pool ID is X and a pool VOL that is not a pool VOL in which a displacement flag 804 is "On" (S2006). The relocation program 3712 judges whether or not there is an unallocated real page (an empty real page) in at least one pool VOL that has been found in the S2006 based on the virtual mapping table 700 that is corresponded to a pool ID=X (S2007).

In the case in which the result of the judgment of S2007 is negative (S2007: No), the relocation program 3712 executes the S2006 while a hierarchy rank order 407=α is α=α+1 (S2009).

In the case in which the result of the judgment of S2007 is positive (S2007: Yes), the relocation program 3712 decides a real page that has been found in the S2007 as a movement destination of a real page that is a target in the S2005 (a real page of a movement source) (S2010). In this case, the relocation program 3712 registers an ID of a real page of a movement destination that has been decided as a relocation destination real page ID 1002 that is corresponded to a real page of a movement source to the displacement progress table 1000 that is corresponded to the selected pool VOL, and registers "Off" as the flag 1003 that is corresponded to the real page of a movement source.

The relocation program 3712 judges whether or not there is a real page in which a relocation destination has not been decided in the selected pool VOL (S2011).

In the case in which the result of the judgment of S2011 is positive (S2011: Yes), the relocation program 3712 executes the S2006 while a priority level=Z is Z=Z+1 (S2008).

In the case in which the result of the judgment of S2011 is negative (S2011: No), the relocation program 3712 judges whether or not there is an unselected pool VOL in at least displacement target VOL that has been found in the S2002 (S2012).

In the case in which the result of the judgment of S2012 is positive (S2012: Yes), the relocation program 3712 selects an arbitrary unselected pool VOL from at least displacement target VOL that has been found in the S2001, and executes the S2006 for the selected pool VOL while a priority level Z=1 (S2013).

In the case in which the result of the judgment of S2012 is negative (S2012: No), the relocation program 3712 makes a pool ID=X to be X=X+1 (S2014).

Moreover, in the case in which there is a pool in which a pool ID is X (S2015: Yes), the relocation program 3712 executes the S2001 for the pool.

In accordance with FIG. 20 and FIG. 21, a real page in a hierarchy in which a hierarchy rank order is higher is decided as a real page of a movement destination on a priority basis for a real page of a movement source in which an I/O frequency is higher.

Figure 22:
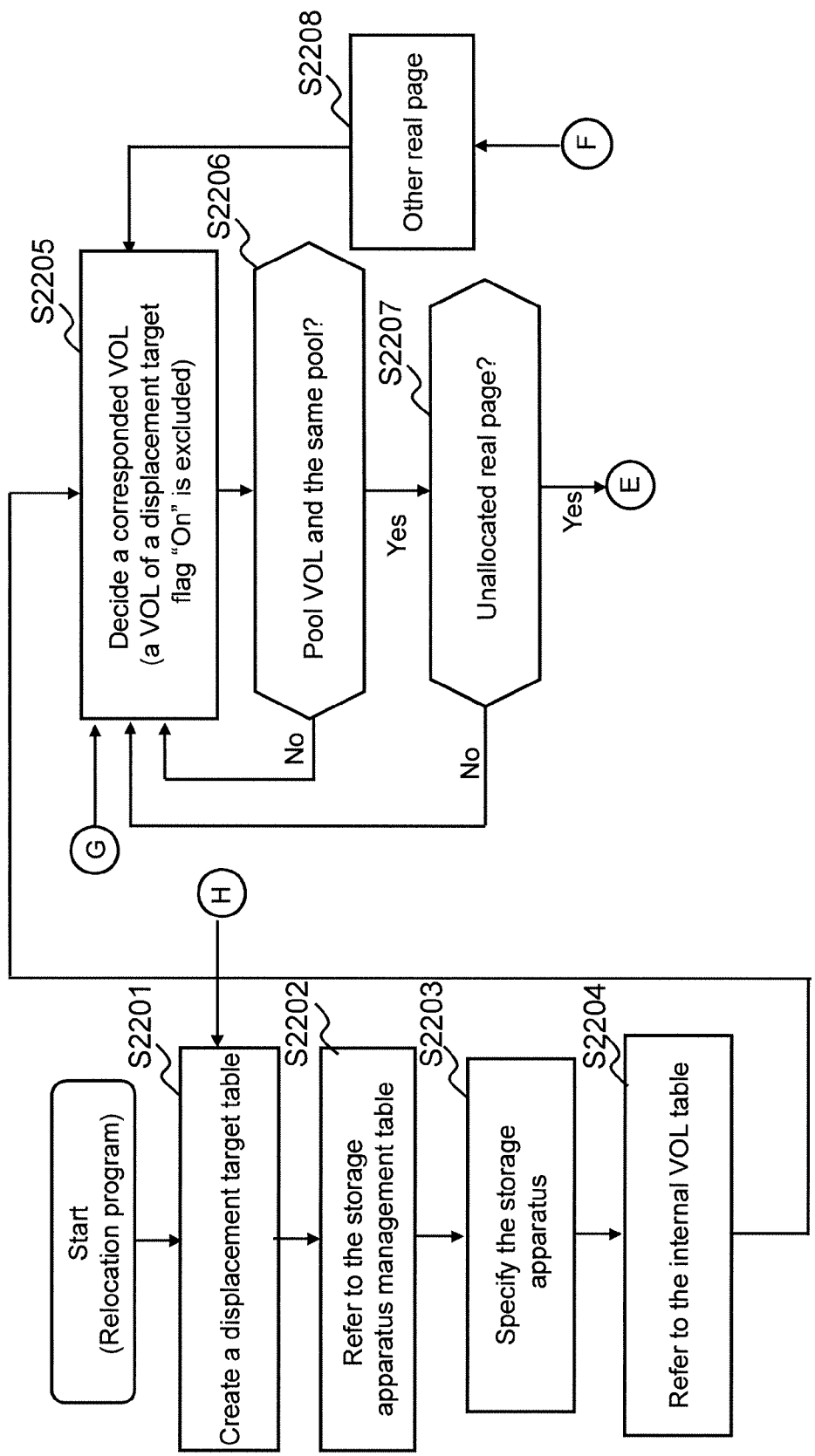
FIG. 22 is a part of a flowchart showing an example of a flow of a relocation destination decision processing in accordance with a case of the second kind.
Figure 23:
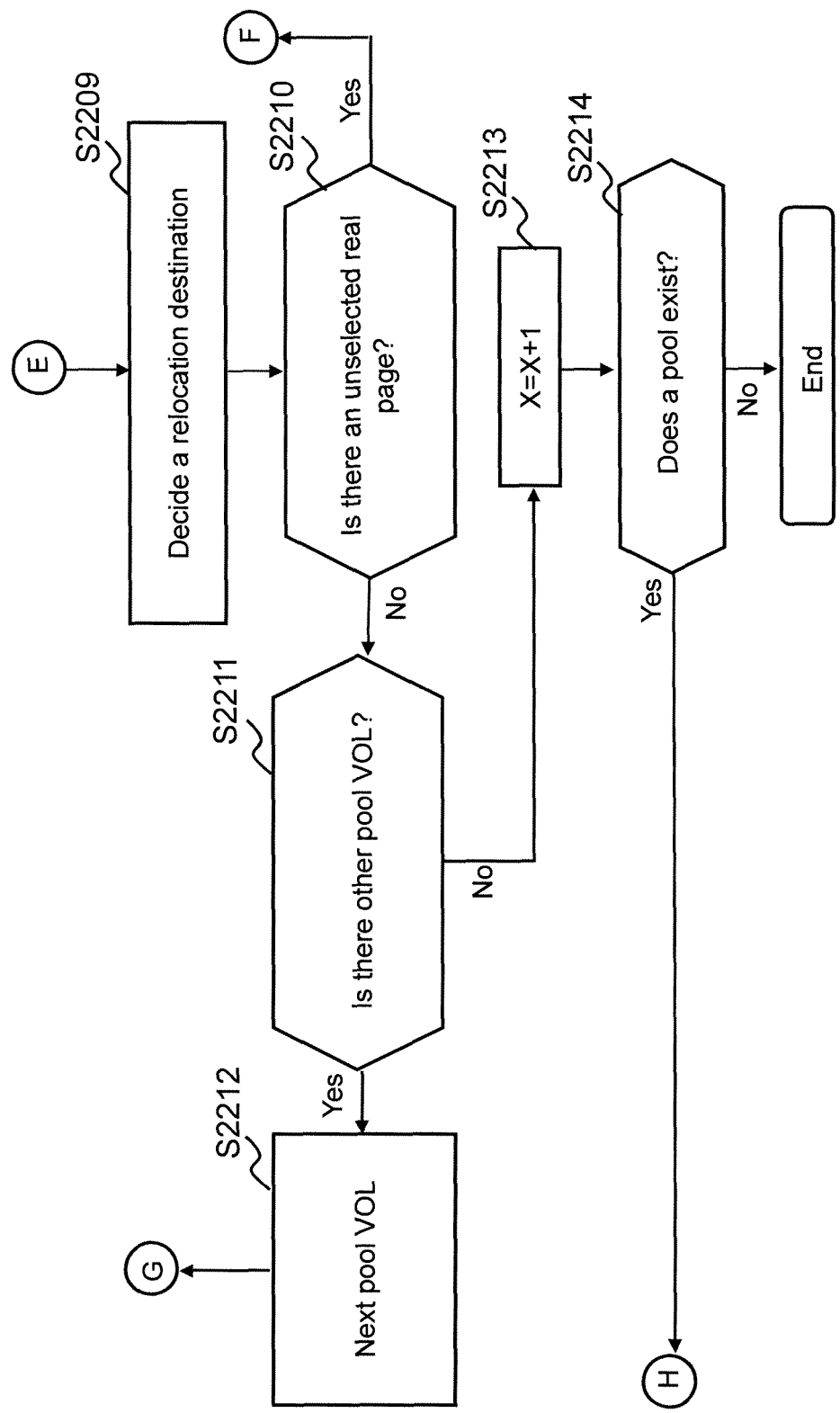
FIG. 23 is a remaining part of a flowchart showing an example of a flow of a relocation destination decision processing in accordance with a case of the second kind.

FIG. 22 and FIG. 23 are the flowcharts showing an example of a flow of a relocation destination decision processing in accordance with a case of the second kind. In the following descriptions, an ID of a pool is X (the initial value of X is "1") to make the descriptions to be more simple.

The relocation program 3712 executes the processing that is equivalent to the S2002 (S2201).

The relocation program 3712 refers to the storage apparatus management table 600 (S2202), and retrieves a storage apparatus that is corresponded to the policy information (S2203).

The relocation program 3712 refers to the internal VOL table 400 (S2204), and finds a VOL that has been mapped in a VOL in the storage apparatus that has been found in the S2203 and in which the displacement flag 804 is not "On" (S2205). In the S2205 moreover, the relocation program 3712 selects an arbitrary unselected pool VOL from at least one displacement target VOL that has been found in the S2201 (a pool VOL that is selected in this step is referred to as a selected pool VOL in the following).

The relocation program 3712 judges whether or not an external VOL that has been found in the S2205 is a VOL that has been mapped in a pool VOL and an ID of a pool that includes the pool VOL is ID=X (S2206).

In the case in which the result of the judgment of S2206 is negative (S2206: No), the relocation program 3712 executes the S2205 again. In the case in which the result of the judgment of S2206 is positive (S2206: Yes), the relocation program 3712 judges whether or not there is an unallocated real page in a pool VOL in which an external VOL that has been found in the S2205 has been mapped (a mapped VOL) based on the virtual mapping table 700 that is corresponded to a pool ID=X (S2207).

In the case in which the result of the judgment of S2207 is negative (S2207: No), the relocation program 3712 executes the S2205 again. In the case in which the result of the judgment of S2207 is positive (S2207: Yes), the relocation program 3712 decides a real page that has been found in the S2207 as a movement destination of one real page in the selected pool VOL (a real page of a movement source) (S2209). In this case, the relocation program 3712 registers an ID of a real page of a movement destination that has been decided as a relocation destination real page ID 1002 that is corresponded to a real page of a movement source to the displacement progress table 1000 that is corresponded to the selected pool VOL, and registers "Off" as the flag 1003 that is corresponded to the real page of a movement source.

The relocation program 3712 judges whether or not there is a real page in which a relocation destination has not been decided in the selected pool VOL (S2210).

In the case in which the result of the judgment of S2210 is positive (S2210: Yes), the relocation program 3712 executes the S2205 for a real page in which a movement destination has not been decided for the selected pool VOL.

In the case in which the result of the judgment of S2210 is negative (S2210: No), the processing that is equivalent to the S2012 to S2015 (see FIG. 21) is executed (S2211 to S2214).

Figure 24:
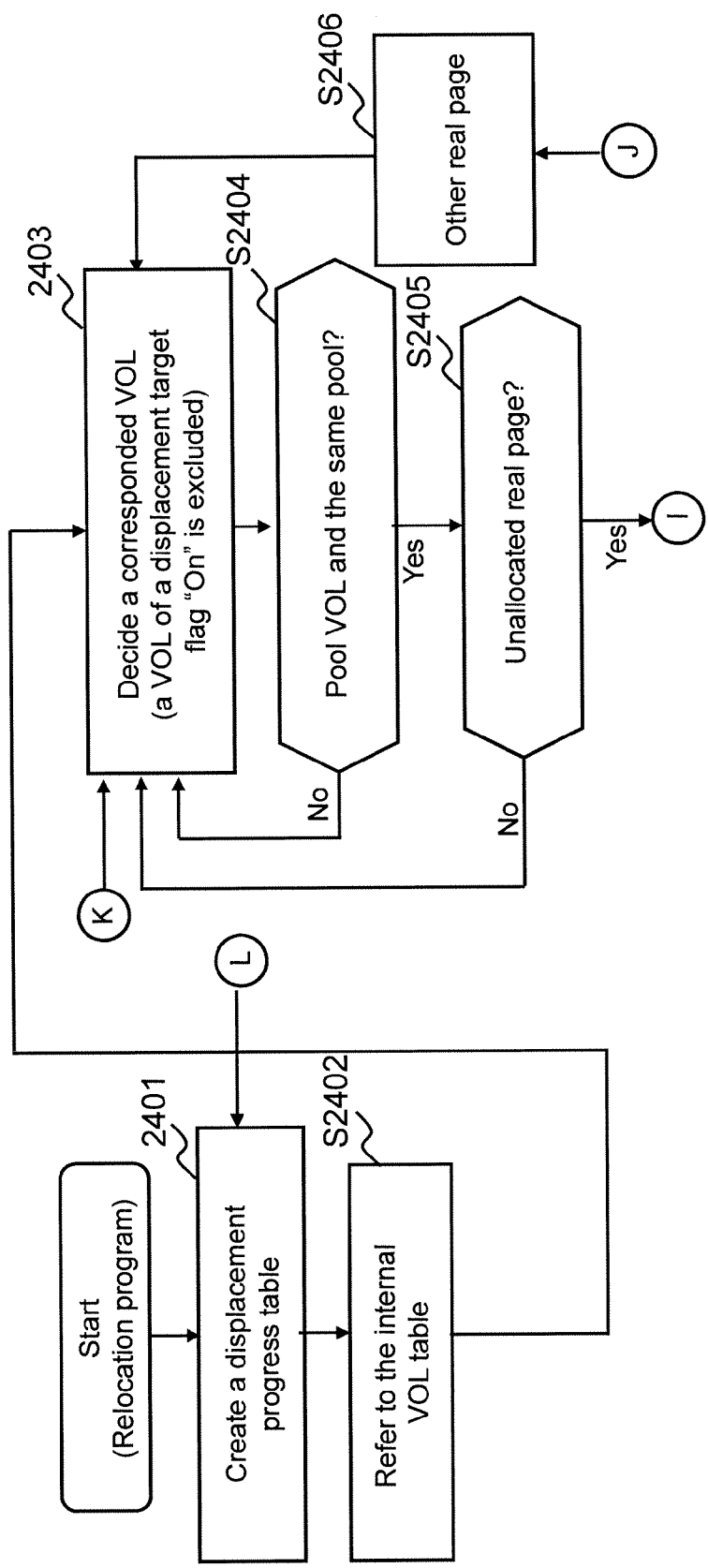
FIG. 24 is a part of a flowchart showing an example of a flow of a relocation destination decision processing in accordance with a case of the third kind.
Figure 25:
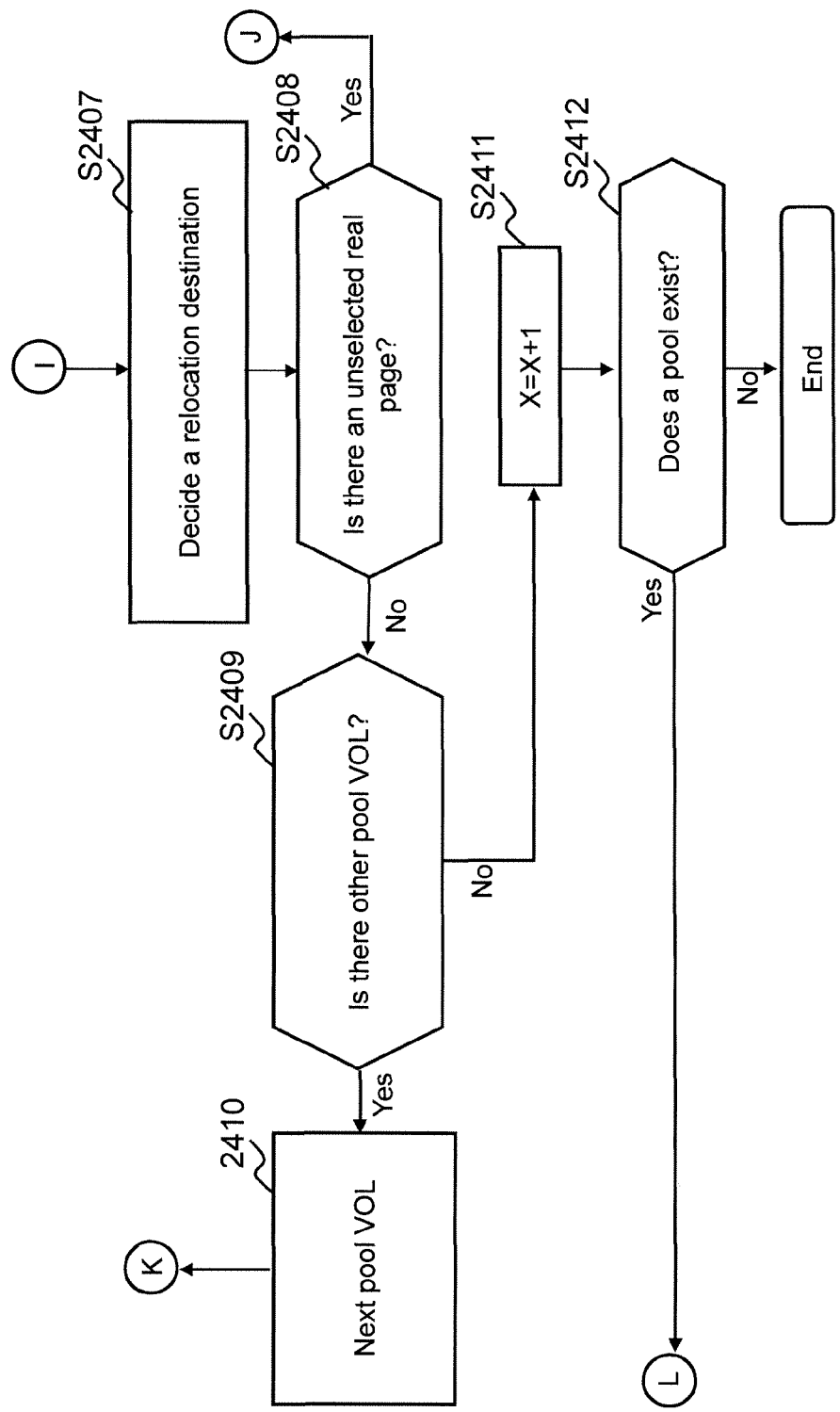
FIG. 25 is a remaining part of a flowchart showing an example of a flow of a relocation destination decision processing in accordance with a case of the third kind.

FIG. 24 and FIG. 25 are the flowcharts showing an example of a flow of a relocation destination decision processing in accordance with a case of the third kind. In the following descriptions, to make the descriptions to be more simple, an ID of a pool is X (X is an integer number equal to or larger than 1) (the initial value of X is "1").

The relocation program 3712 executes the processing that is equivalent to the S2001 (S2401).

The relocation program 3712 refers to the internal VOL table 400 (S2404), and finds a VOL that is a basis of a drive that is corresponded to the policy information and in which the displacement flag 804 is not "On" (S2403). In the S2403 moreover, the relocation program 3712 selects an arbitrary unselected pool VOL from at least one displacement target VOL that has been found in the S2401 (a pool VOL that is selected in this step is referred to as a selected pool VOL in the following).

The relocation program 3712 judges whether or not a VOL that has been found in the S2402 is a pool VOL and an ID of a pool that includes the pool VOL is ID=X (S2404).

In the case in which the result of the judgment of S2404 is negative (S2404: No), the relocation program 3712 executes the S2403 again. In the case in which the result of the judgment of S2404 is positive (S2404: Yes), the processing that is equivalent to the S2207 to S2214 (see FIG. 22 and FIG. 23) is executed (S2405 to S2412). The relocation destination decision processing in accordance with the cases of the first kind, the second kind, and the third kind described above is not restricted to a relocation destination decision processing that is executed as a part of a displacement processing (a first relocation destination decision processing), and can be applied to a relocation destination decision processing that is executed independently from a displacement processing (a second relocation destination decision processing). For the second relocation destination decision processing, a real page in a pool VOL in which the displacement flag 804 is "On" is also excluded as a real page of a movement destination (see FIG. 27A). For the second relocation destination decision processing moreover, a real page in a pool VOL in which the format inhibition flag 803 is "On" is excluded as a real page of a movement source (see FIG. 27B).

Figure 26:
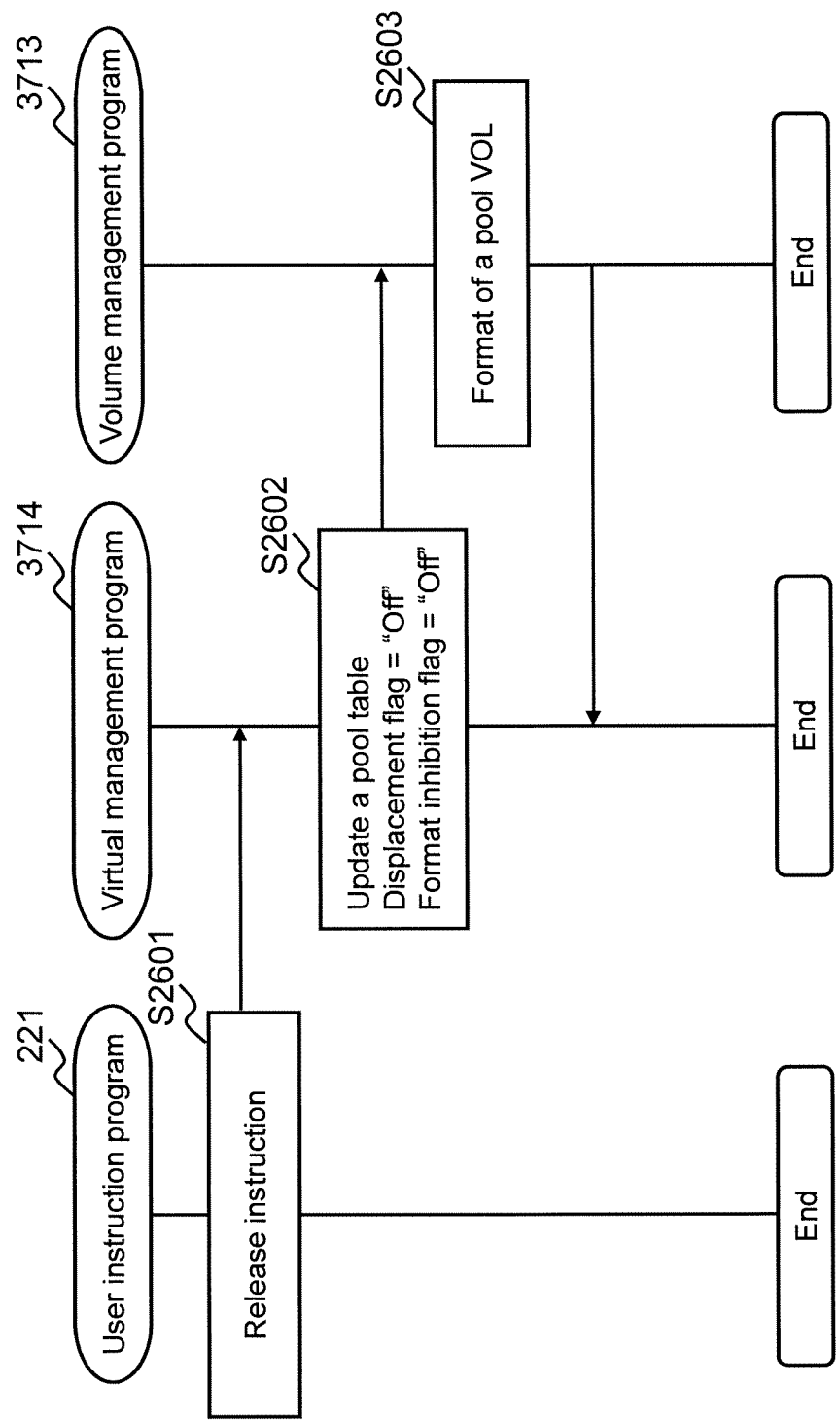
FIG. 26 is a flowchart showing an example of a flow of a displacement target release processing.

FIG. 26 is a flowchart showing an example of a flow of a displacement target release processing.

The user instruction program 221 transmits an instruction for releasing a displacement release flag (hereafter referred to as a release instruction) to the virtual management program 3714 (S2601). The release instruction includes an ID of a pool VOL. The virtual management program 3714 receives the release instruction, and specifies the displacement flag 804 to be "Off" and the format inhibition flag 803 to be "Off" in accordance with the instruction for a pool VOL that is specified by the instruction (hereafter referred to as a release target pool VOL) (S2602). The VOL management program 3713 formats a pool VOL in which the format inhibition flag 803 has been modified to be "Off" (a release target pool VOL) (S2603).

The VOL management program 3713 notifies the virtual management program 3714 of that the release target pool VOL has been formatted. In accordance with the displacement target release processing, not only the displacement flag 804 is specified to be "Off" but also the format inhibition flag 803 is specified to be "Off", and the release target pool VOL is formatted. By this configuration, a real page in the pool VOL becomes an unallocated page and in a state in which the page can be allocated.

While the preferred embodiment in accordance with the present invention has been described above, the preferred embodiment is an illustrative example for explaining the present invention, and the scope of the present invention is not restricted to the preferred embodiment. In other words, various changes, modifications, and functional additions can be thus made without departing from the scope of the present invention.

What is claimed is:

1. A storage control apparatus comprising:
    an interface device that is coupled to a plurality of physical storage devices; and a controller that is coupled to the interface device,
    wherein the controller is configured to manage a pool that includes at least one of one or a plurality of logical volumes based on the plurality of physical storage devices as a pool volume, each of the pool volumes is divided into at least two real areas,
    (A) the controller includes a first logical volume in which data has been stored in a pool and divides the first logical volume into at least two real areas,
    (B) the controller is configured to allocate the first logical volume to a second logical volume that is a virtual logical volume that has been divided into at least two virtual areas, and
    (C) the controller is configured to execute a first data movement processing for moving all data of the first logical volume to the at least one pool volume other than the first logical volume, and allocate a real area of a movement destination of the data to a virtual area of an allocated destination of a real area of a movement source of the data as substitute for the real area in the first data movement processing,
    wherein the controller is configured to manage a third logical volume that has been divided into at least two virtual areas, and execute a second data movement processing for moving data in a real area that has been allocated to any one of the virtual areas to an unallocated real area in the pool, and
    (p) the second data movement processing is executed, wherein the controller is configured to not specify the real area of the first logical volume as a movement source of the data or a movement destination of the data for the second data movement processing,
    wherein in the case in which the first data movement processing is terminated, the first logical volume is provided with an unallocated real area, and
    wherein the controller is configured to execute the (p) after the first data movement processing is terminated.

2. The storage control apparatus according to claim 1, wherein:
    the controller is configured to execute the (p) after the first data movement processing is started.

3. The storage control apparatus according to claim 1, wherein:
    a storage capacity of the second logical volume is equivalent to that of the first logical volume, and the controller is configured to allocate all real areas that configure the first logical volume to all virtual areas that configure the second logical volume respectively in the (B).

4. The storage control apparatus according to claim 3, wherein:
the controller does not specify a real area in which only invalid data has been stored as a movement source for the first logical volume in the (C).

5. The storage control apparatus according to claim 1, wherein:
at least one of the plurality of physical storage devices is an external storage control apparatus, and
the first logical volume is a virtual logical volume to which a logical volume in the external storage control apparatus is mapped.

6. The storage control apparatus according to claim 1, wherein:
at least one of the plurality of physical storage devices is an internal storage device, and
the first logical volume is a logical volume other than the at least one pool volume based on the internal storage device.

7. A storage control apparatus comprising:
an interface device that is coupled to a plurality of physical storage devices; and a controller that is coupled to the interface device,
wherein the controller is configured to manage a pool that includes at least one of one or a plurality of logical volumes based on the plurality of physical storage devices as a pool volume, each of the pool volumes is divided into at least two real areas,
(A) the controller includes a first logical volume in which data has been stored in a pool and divides the first logical volume into at least two real areas,
(B) the controller is configured to allocate the first logical volume to a second logical volume that is a virtual logical volume that has been divided into at least two virtual areas, and
(C) the controller is configured to execute a first data movement processing for moving all data of the first logical volume to the at least one pool volume other than the first logical volume, and allocate a real area of a movement destination of the data to a virtual area of an allocated destination of a real area of a movement source of the data as substitute for the real area in the first data movement processing,
wherein the controller is configured to manage a third logical volume that has been divided into at least two virtual areas, and execute a second data movement processing for moving data in a real area that has been allocated to any one of the virtual areas to an unallocated real area in the pool, and
(p) the second data movement processing is executed, wherein the controller is configured to not specify the real area of the first logical volume as a movement source of the data or a movement destination of the data for the second data movement processing,
wherein the first logical volume is a format inhibition target, and
in the case in which the controller includes a logical volume in the pool and the logical volume is not a format inhibition target, although the controller includes the logical volume in the pool after a format is executed, the controller includes the first logical volume in the pool without formatting the first logical volume in the (A) since the first logical volume is a format inhibition target.

8. The storage control apparatus according to claim 7, wherein:
in the case in which the controller starts the second data movement processing before the first data movement processing, the controller does not specify the real area of the first logical volume that is a format inhibition target as a movement source of the data.

9. The storage control apparatus according to claim 7, wherein:
the controller is configured to specify the first logical volume as a data movement target in the case of the first data movement processing, and execute the (p) after the data movement target is specified, and
in the case in which the predetermined event occurs, the controller does not specify the first logical volume as the format inhibition target or as the data movement target.

10. The storage control apparatus according to claim 7, wherein:
in the ease in which the controller specifies that a pool volume that is allocated to the second logical volume is the first logical volume that has been specified as a format inhibition target, the controller is configured to execute the (B).

11. A storage control apparatus comprising:
an interface device that is coupled to a plurality of physical storage devices; and a controller that is coupled to the interface device,
wherein the controller is configured to manage a pool that includes at least one of one or a plurality of logical volumes based on the plurality of physical storage devices as a pool volume, each of the pool volumes is divided into at least two real areas,
(A) the controller includes a first logical volume in which data has been stored in a pool and divides the first logical volume into at least two real areas,
(B) the controller is configured to allocate the first logical volume to a second logical volume that is a virtual logical volume that has been divided into at least two virtual areas, and
(C) the controller is configured to execute a first data movement processing for moving all data of the first logical volume to the at least one pool volume other than the first logical volume, and allocate a real area of a movement destination of the data to a virtual area of an allocated destination of a real area of a movement source of the data as substitute for the real area in the first data movement processing,
wherein the controller is configured to manage a third logical volume that has been divided into at least two virtual areas, and allocate an unallocated real area to the virtual area from the pool in accordance with a write to an unallocated virtual area of the third logical volume, and
(q) the controller is configured to allocate an unallocated real area from a pool volume other than the first logical volume in the write to an unallocated virtual area of the third logical volume.

12. A storage control apparatus comprising:
an interface device that is coupled to a plurality of physical storage devices; and a controller that is coupled to the interface device,
wherein the controller is configured to manage a pool that includes at least one of one or a plurality of logical volumes based on the plurality of physical storage devices as a pool volume, each of the pool volumes is divided into at least two real areas, (A) the controller includes a first logical volume in which data has been stored in a pool and divides the first logical volume into at least two real areas, (B) the controller is configured to allocate the first logical volume to a second logical volume that is a virtual logical volume that has been divided into at least two virtual areas, and (C) the controller is configured to execute a first data movement processing for moving all data of the first logical volume to the at least one pool volume other than the first logical volume, and allocate a real area of a movement destination of the data to a virtual area of an allocated destination of a real area of a movement source of the data as substitute for the real area in the first data movement processing, wherein a physical storage device based on the real area of the movement destination is a physical storage device in which at least one of the information related to a location of the physical storage device and the introduction date and time conforms to a predetermined condition in the first data movement processing.

13. A data movement method comprising the steps of:

(A) including a first logical volume in which data has been stored in a pool that includes at least one of one or a plurality of logical volumes based on a plurality of physical storage devices as a pool volume, and dividing the first logical volume into at least two real areas;

(B) allocating the first logical volume to a second logical volume that is a virtual logical volume that has been divided into at least two virtual areas;

(C) executing a first data movement processing for moving all data of the first logical volume to the at least one pool volume other than the first logical volume, and allocating a real area of a movement destination of the data to a virtual area of an allocated destination of a real area of a movement source of the data as substitute for the real area in the first data movement processing;

(D) managing a third logical volume that has been divided into at least two virtual areas, and executing a second data movement processing for moving data in a real area that has been allocated to any one of the virtual areas to an unallocated real area in the pool;

(p) wherein the second data movement processing is executed, the real area of the first logical volume is not specified as a movement source of the data or a movement destination of the data for the second data movement processing; and in the case in which the first data movement processing is terminated, providing the first logical volume with an unallocated real area, and executing the (p) after the first data movement processing is terminated.

* * * * *